US007577989B1

(12) United States Patent
Bhat

(10) Patent No.: US 7,577,989 B1
(45) Date of Patent: Aug. 18, 2009

(54) ENTERPRISE RESPONDER FOR EMERGENCIES AND DISASTER

(75) Inventor: Sandeep Ashok Bhat, Pleasanton, CA (US)

(73) Assignee: United Software Associates, Inc., Pleasanton, CA (US)

( * ) Notice: Subject to any disclaimer, the term of this patent is extended or adjusted under 35 U.S.C. 154(b) by 790 days.

(21) Appl. No.: 10/966,743

(22) Filed: Oct. 16, 2004

Related U.S. Application Data

(60) Provisional application No. 60/512,442, filed on Oct. 20, 2003, provisional application No. 60/512,443, filed on Oct. 20, 2003, provisional application No. 60/512,441, filed on Oct. 20, 2003.

(51) Int. Cl.
*G06F 7/04* (2006.01)

(52) U.S. Cl. ........................................................ 726/16

(58) Field of Classification Search .................... 726/16
See application file for complete search history.

(56) References Cited

U.S. PATENT DOCUMENTS

2004/0084527 A1 * 5/2004 Bong et al. ................. 235/385

* cited by examiner

*Primary Examiner*—Jacob Lipman
(74) *Attorney, Agent, or Firm*—Maryam Imam

(57) ABSTRACT

A enterprise security management (ESM) system having a web-based platform for authorizing and monitoring visitors of a secure facility and for further providing a time-stamping process for noting the time of arrival and departure of the visitors and for alerting authorities when the duration of stay of a visitor has exceeded the predetermined time for visiting allotted the visitor.

12 Claims, 37 Drawing Sheets

(For DEMO, please visit: www.UnitedSecurityApplications.com)

Time Stamp Process

Locations 1 to N: Are terminals connected to the Internet/Intranet

ENTERPRISE RESPONDER FOR EMERGENCIES AND DISASTER

CROSS REFERENCE TO RELATED APPLICATION

This application claims priority to U.S. Provisional Patent Application having been assigned Application No. 60/512,442, entitled "Process of Creating Disaster Management and Emergency Response Website", and filed on Oct. 20, 2003 by Sandeep Bhat is and to U.S. Provisional Patent Application, Application No. 60/512,443, entitled "Email Based Visitor Appointment Scheduling Process", and filed on Oct. 20, 2003 by Sandeep Bhat, and to U.S. Provisional Patent Application having been assigned Application No. 60/512,441, entitled "Visitor Time-Stamping, Diversion and Identification Process", and filed on Oct. 20, 2003, by Sandeep Bhat.

BACKGROUND OF THE INVENTION

1. Field of the Invention

The present invention relates generally to security related products and services and particularly to Internet-based software programs for identifying and tracking external threats using an enterprise responder software program for emergencies and disasters.

2. Description of the Prior Art

Interest in security-related products and services has been soaring since the events of Sep. 11, 2001. Repeated news flashes concerning the wars in Afghanistan and Iraq and the most recent terrorist incidents in Russia have kept security related topics in the spotlight. In addition, announcements from the White House on March, 2003 regarding creation of "the Department of Homeland Security" (DHS) have amplified the need for greater security methods and apparatus, particularly in public areas, such as malls, buildings, government structures, airports and the like.

There is thus a greater need for security solutions that allow for identification of threats and are prepared during emergencies and disasters. However, currently, most organizations are unable to successfully identify threats from external elements, such as outsiders, vehicles and/or material having access to their facilities. This problem is further exacerbated in the event of an emergency or a disaster, as almost no one today has the visual map and related information regarding the facility available on one common platform. Additionally, there are no enterprise class security knowledge management applications or software program available with the ability to understand the various security applications and databases in a facility and to provide a collaborative platform to share information amongst decision makers in the event of security lapses or emergencies.

Perhaps further details of the foregoing will make the existing security deficiencies better understood. As a supposition, lets think of a situation either at home or work, in an emergency situation, such as fire, explosion, etc. or a disaster, such as an earthquake, hurricane, etc. or a threat situation, such as hostages, terrorist attack, armed robbery, etc. The responders, which often constitute over twenty different agencies like the fire department, the police department, SWAT, etc., do not necessarily know the following information:

Who is inside the building at the time of the emergency, disaster or threat.

Who may be responsible (external elements).

Whom should the responders contact.

Who should take the lead.

What is the interior/exterior topology of the building being affected.

Are there any key assets, such as humans and/or material, inside which they must first secure.

Who are the experts having specialized knowledge about this situation.

What are some of the previous situations, if any, similar to this one and what was the best response then.

The foregoing list goes on and on but suffice it to say that currently organizations do not have applications that are able to identify threats, correlate the identified threats with other security related information and share the correlated information with relevant people.

Currently, there are Geographic Information Systems (GIS) that can provide detailed information and maps of the overall location of an identified structure, such as a building, hospital, school and the like. However, such detailed information and maps lack sufficient details, thought to be necessary, by responders for effectively saving lives and property in the event of threat, emergency or disaster.

Thus, the need arises for provide a security system and method for capturing relevant and detailed information regarding structures thought to be potential victims of disasters, emergencies and threats, and having such information available to users or respondents through a website, over the Internet, to effectively save lives and property.

SUMMARY OF THE INVENTION

Briefly, an enterprise security management (ESM) system is disclosed in accordance with one embodiment of the present invention. The ESM has a web-based platform for authorizing and monitoring visitors of a secure facility and for further providing a time-stamping process for noting the time of arrival and departure of the visitors and for alerting authorities when the duration of stay of a visitor has exceeded the predetermined time for visiting allotted the visitor The foregoing and other objects, features and advantages of the present invention will be apparent from the following detailed description of the preferred embodiments which make reference to several figures of the drawing.

IN THE DRAWINGS

Figure 16:
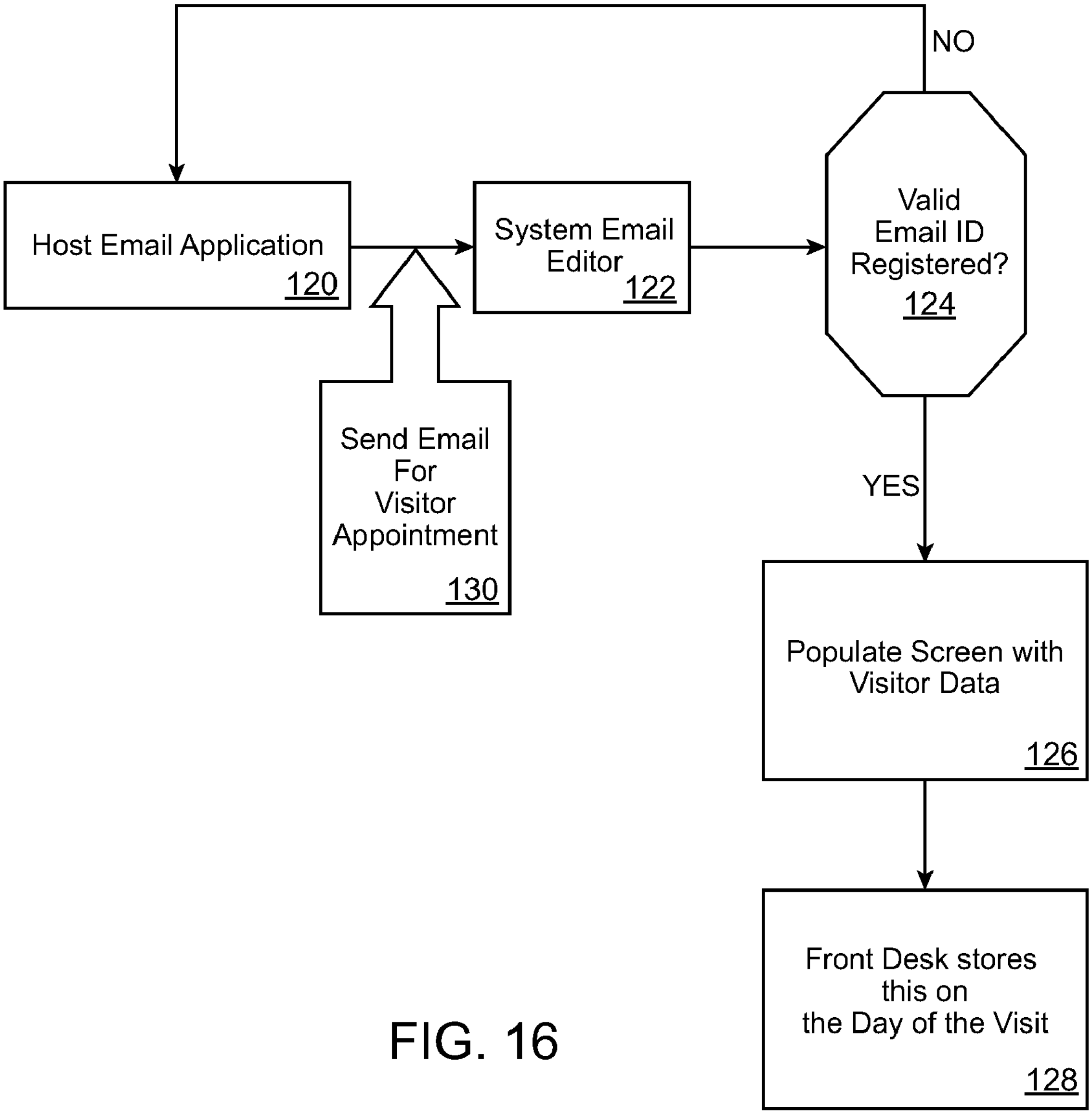

FIG. 16 shows a host email application 120 for sending email for visitor appointments 130 to the system email editor 122.

Figure 17:
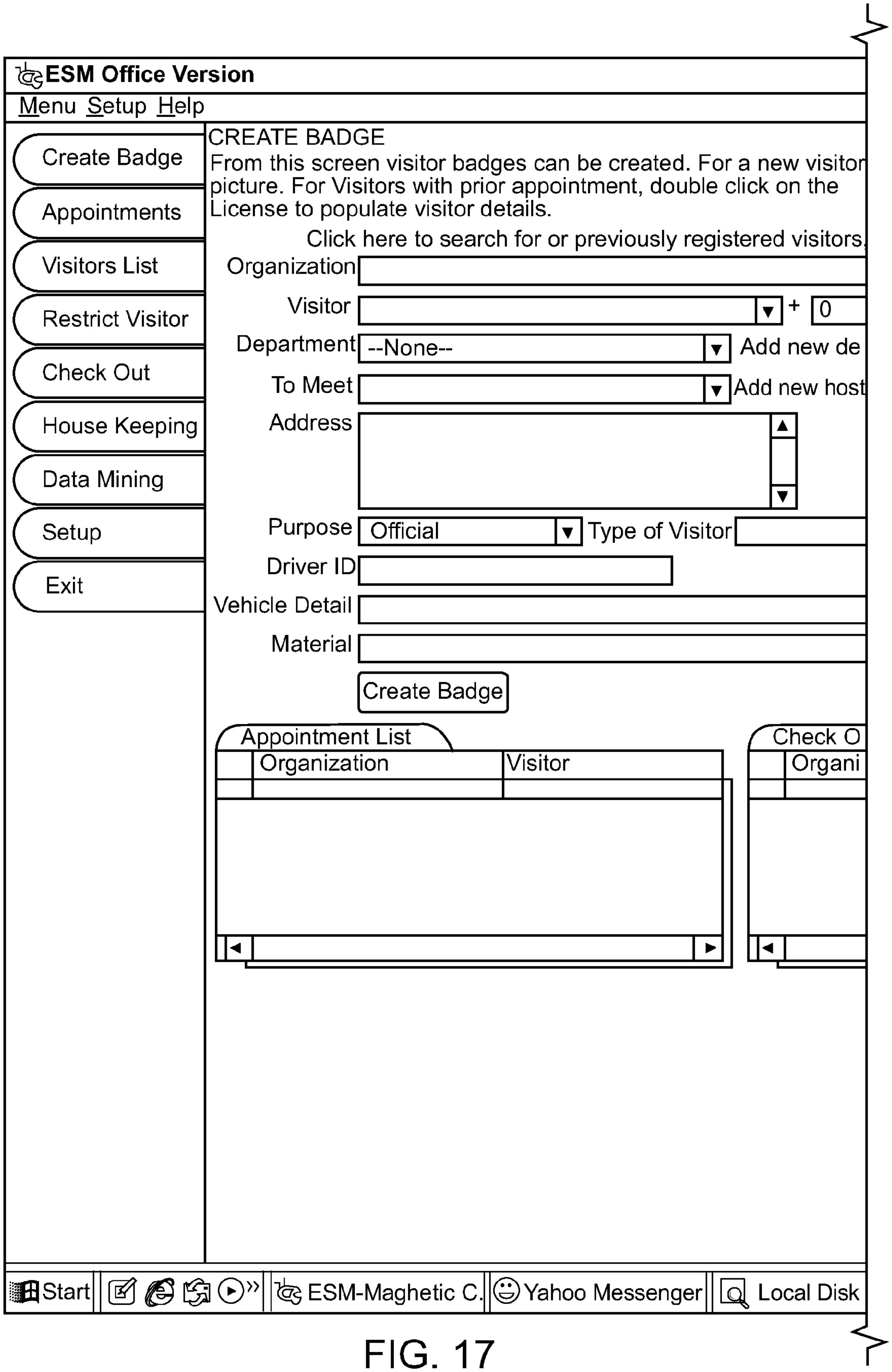
Figure 17:
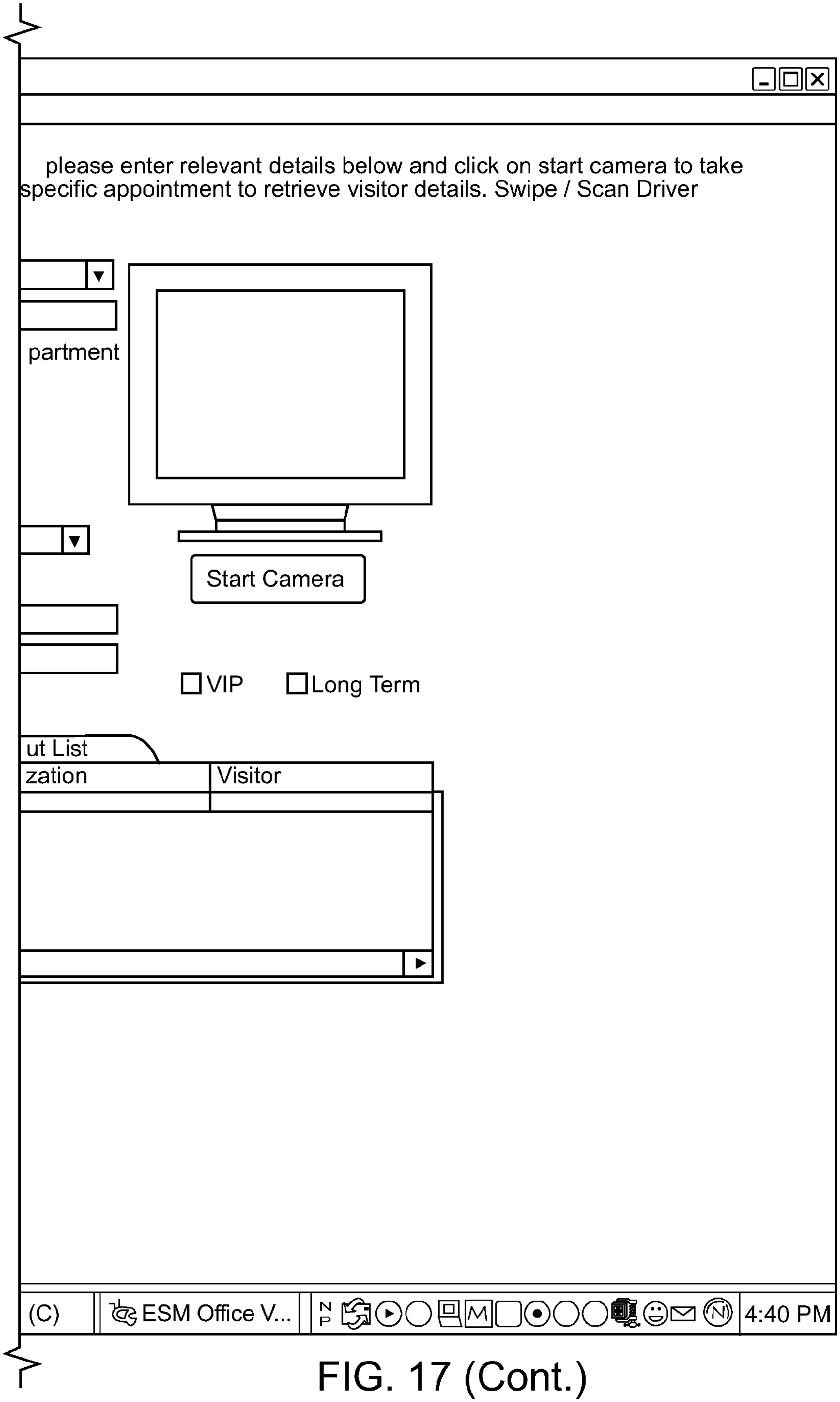

FIG. 17 shows a screen for creating a badge for a visitor visiting a secure facility.

Figure 18:
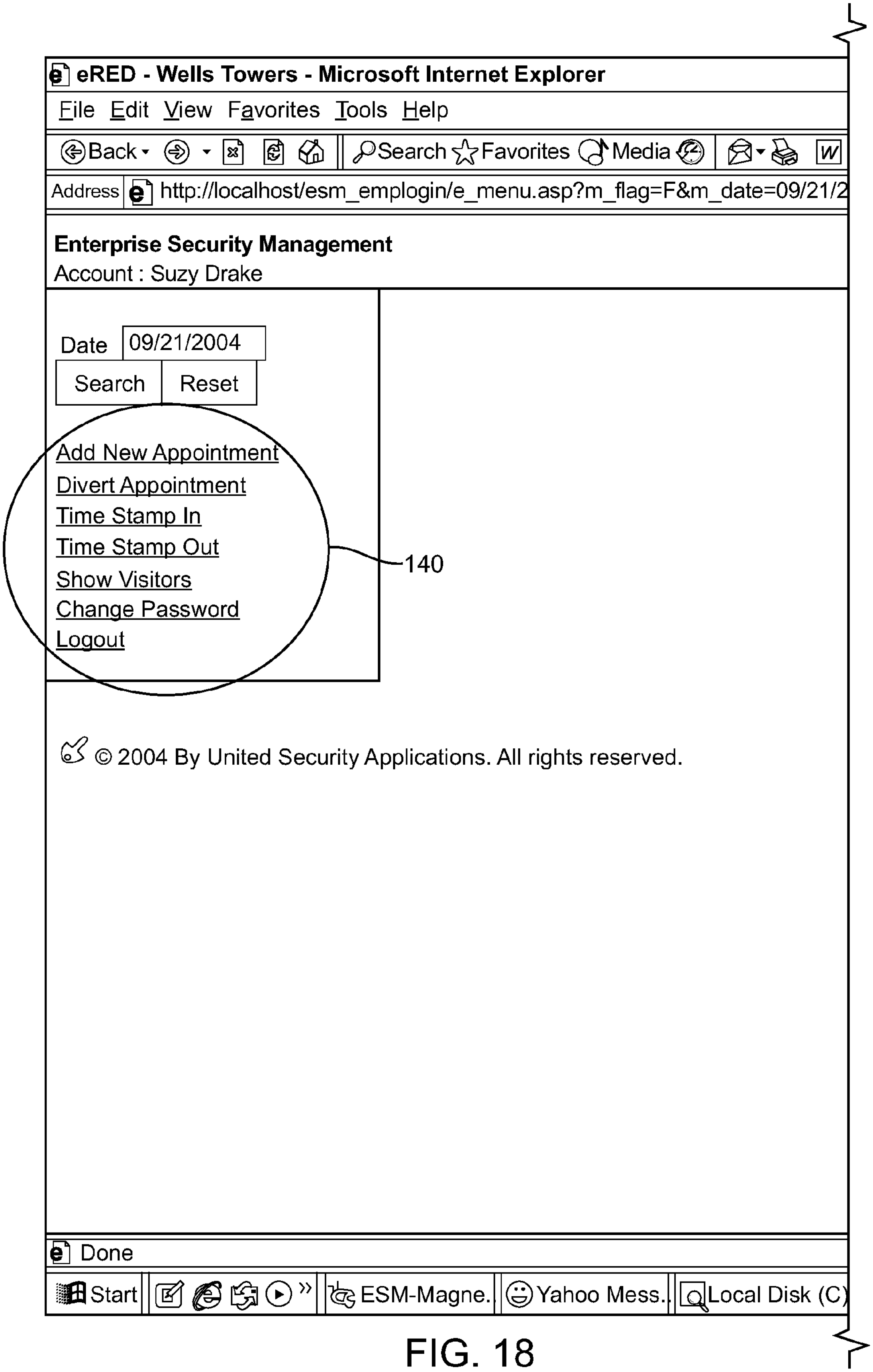
Figure 18:
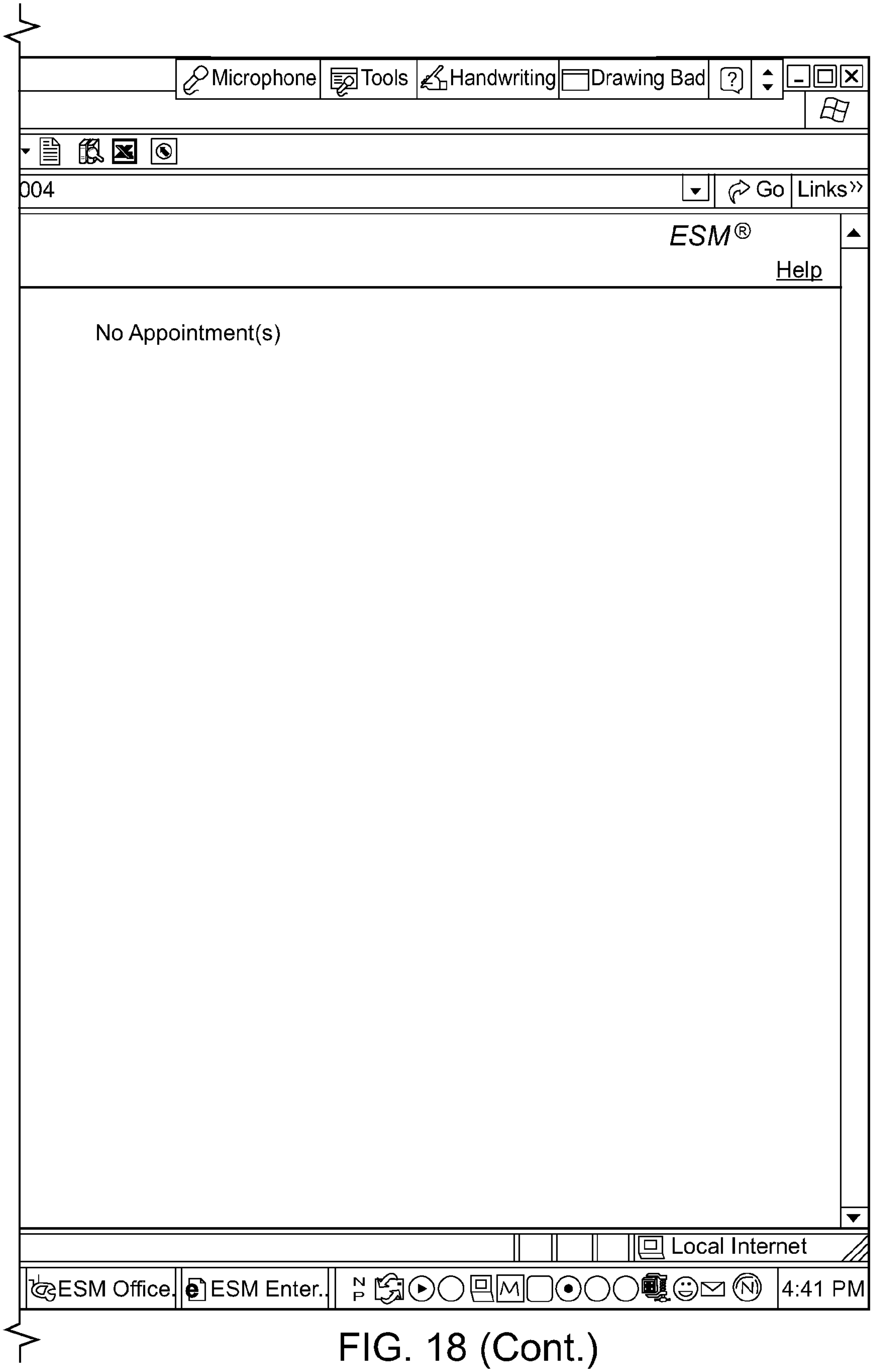

FIG. 18 shows an ESM screen with various options shown at 140 for the user to select.

Figure 19:
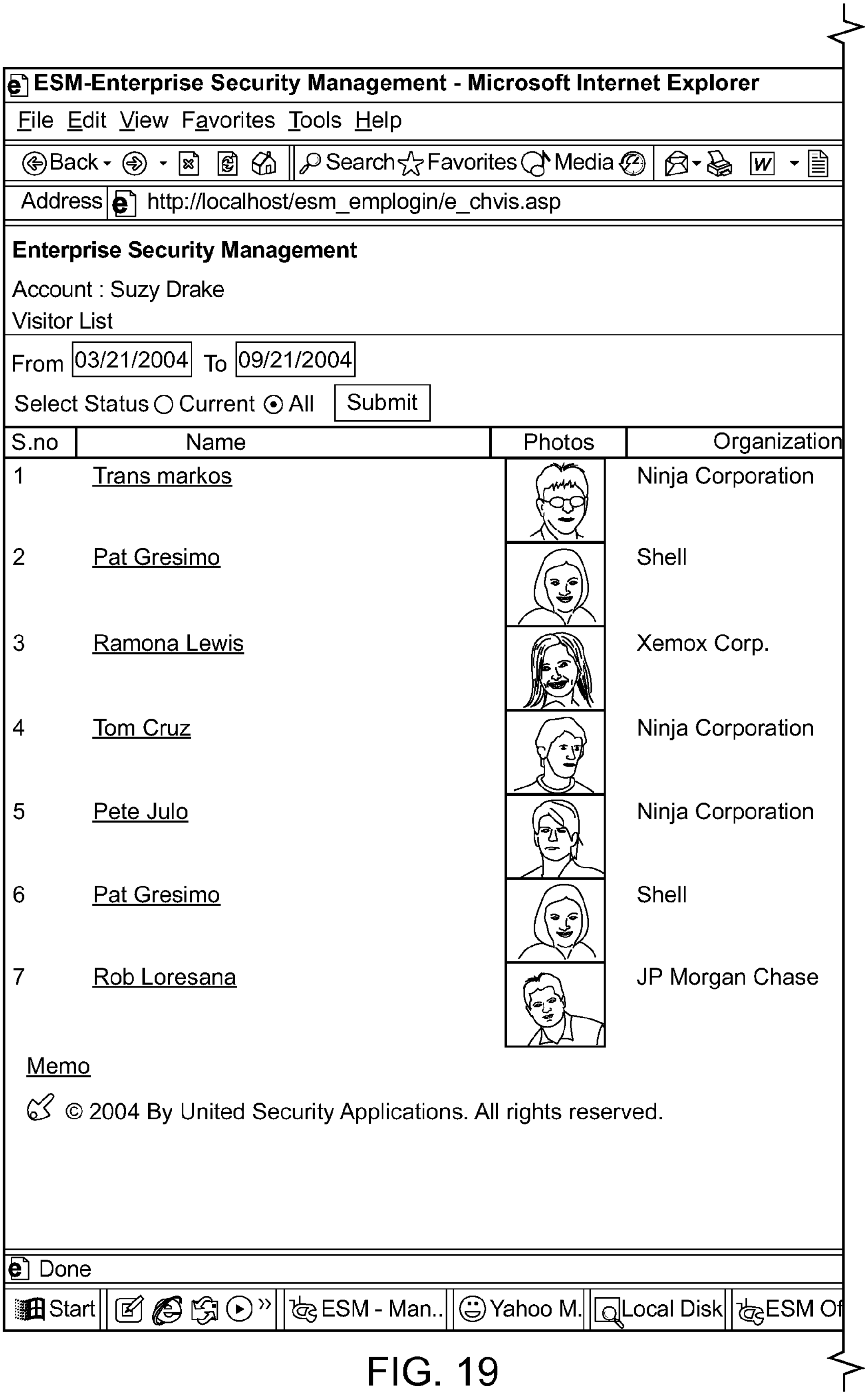
Figure 19:
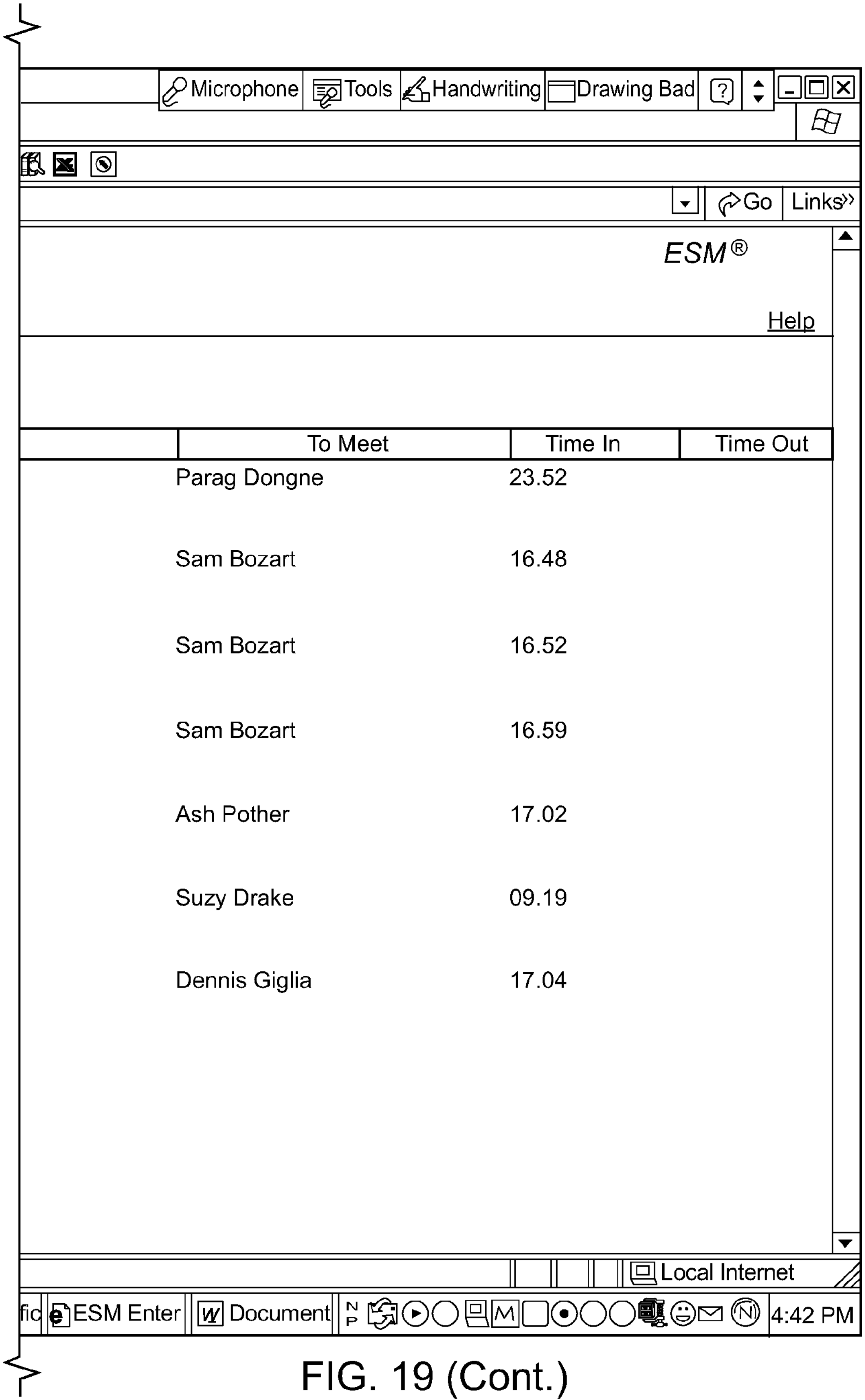

FIG. 19 shows a screen of the existing visitor list of a secure facility.

Figure 20:
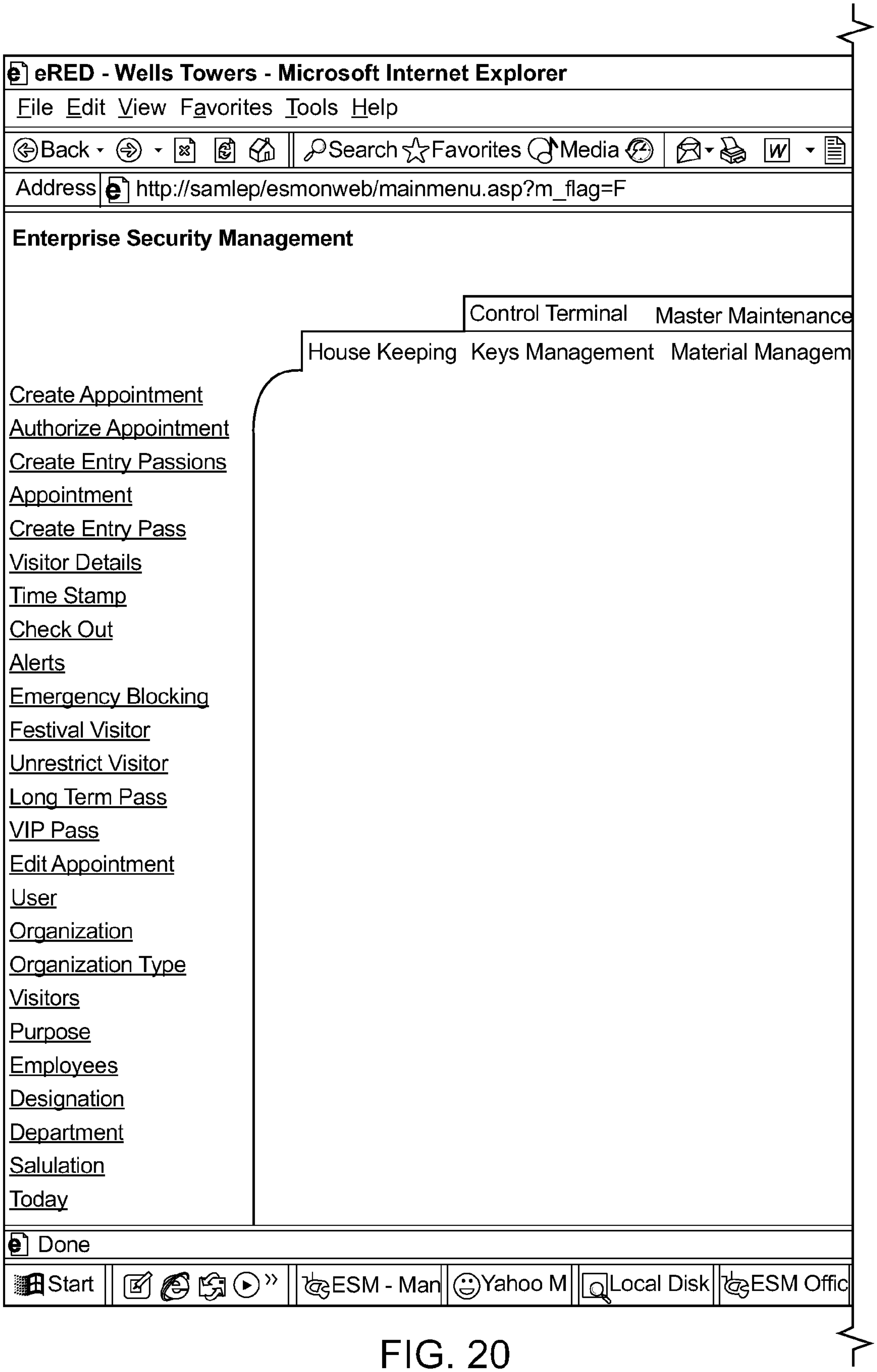
Figure 20:
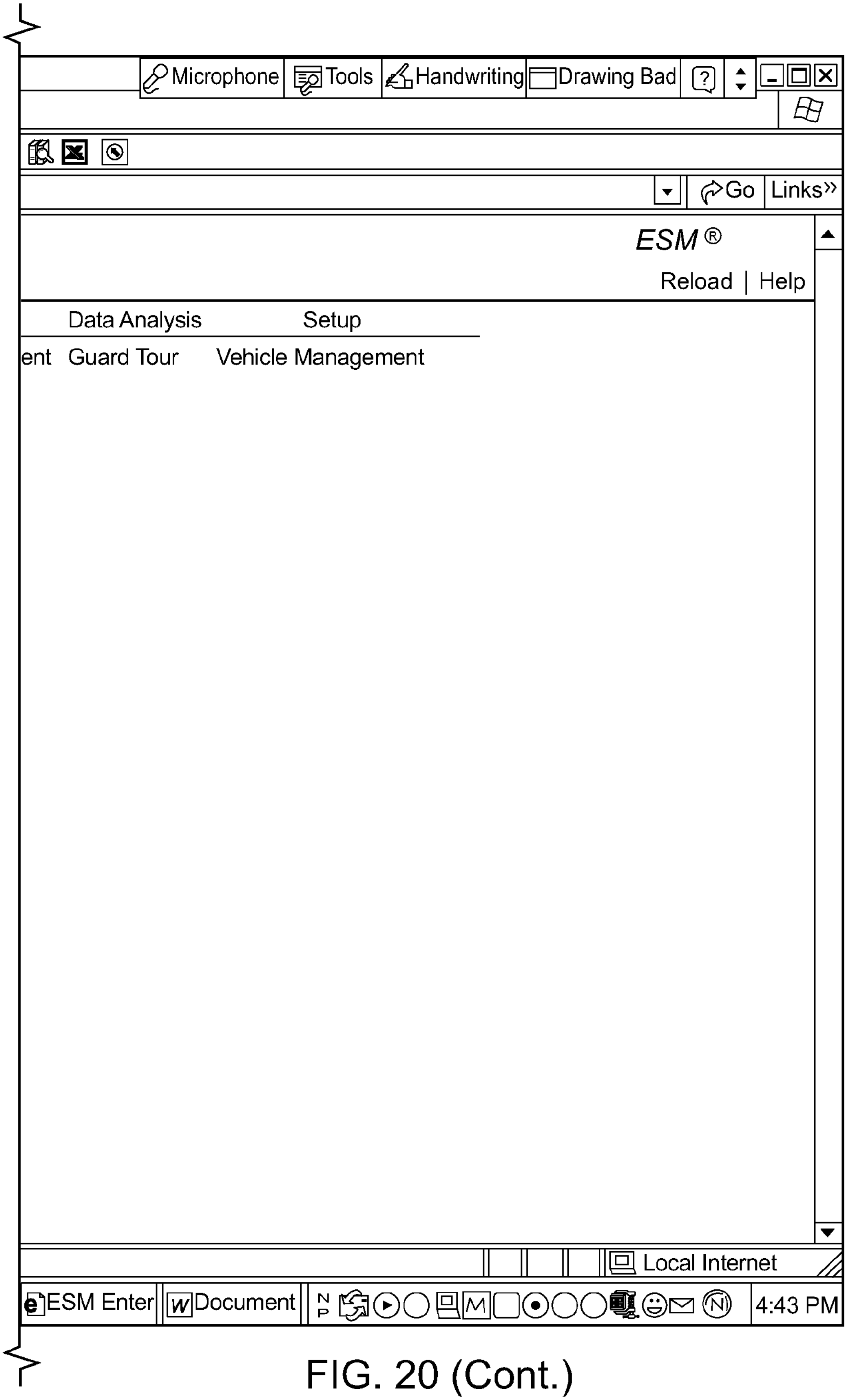
Figure 20A:
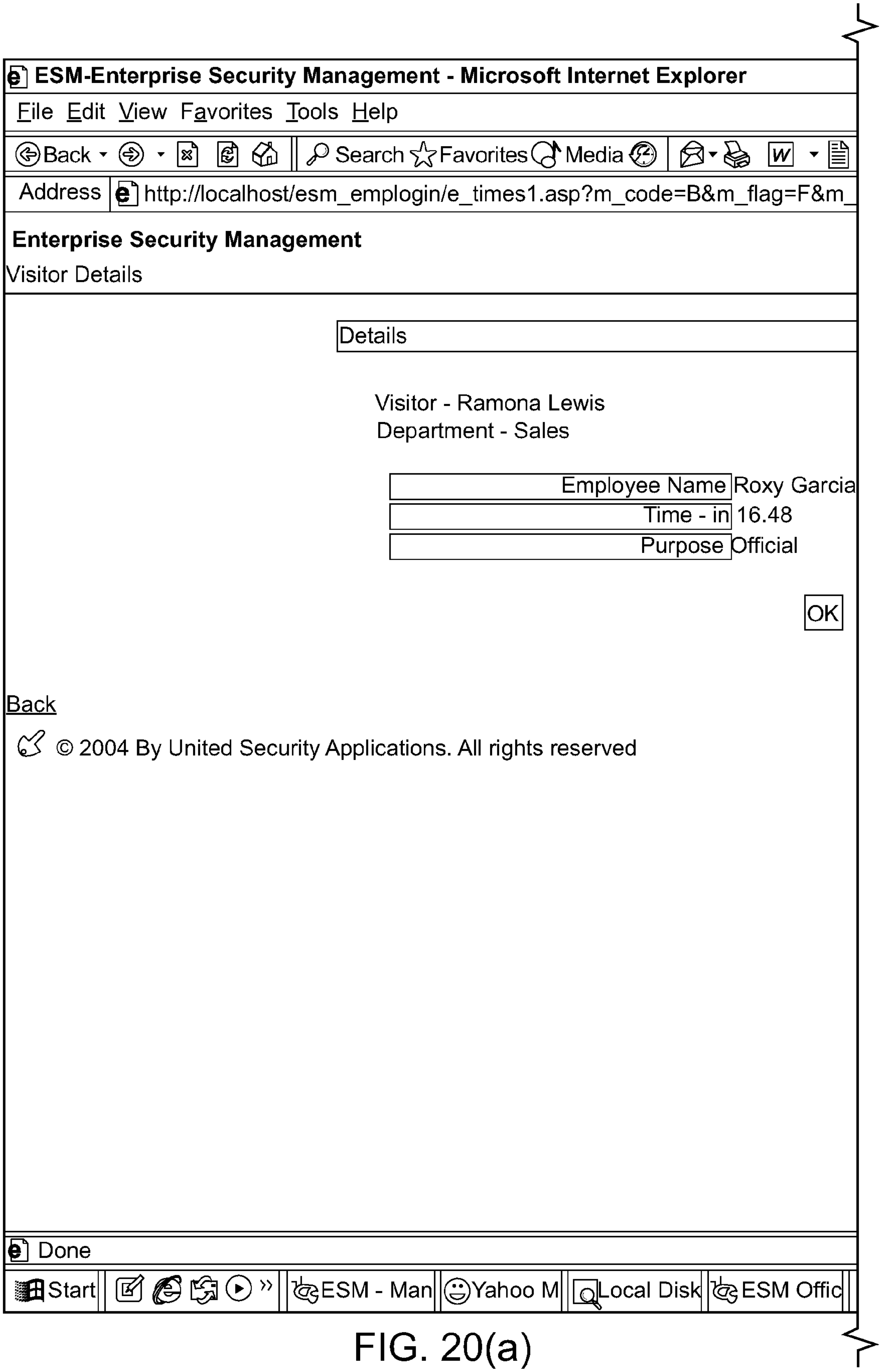
Figure 20A:
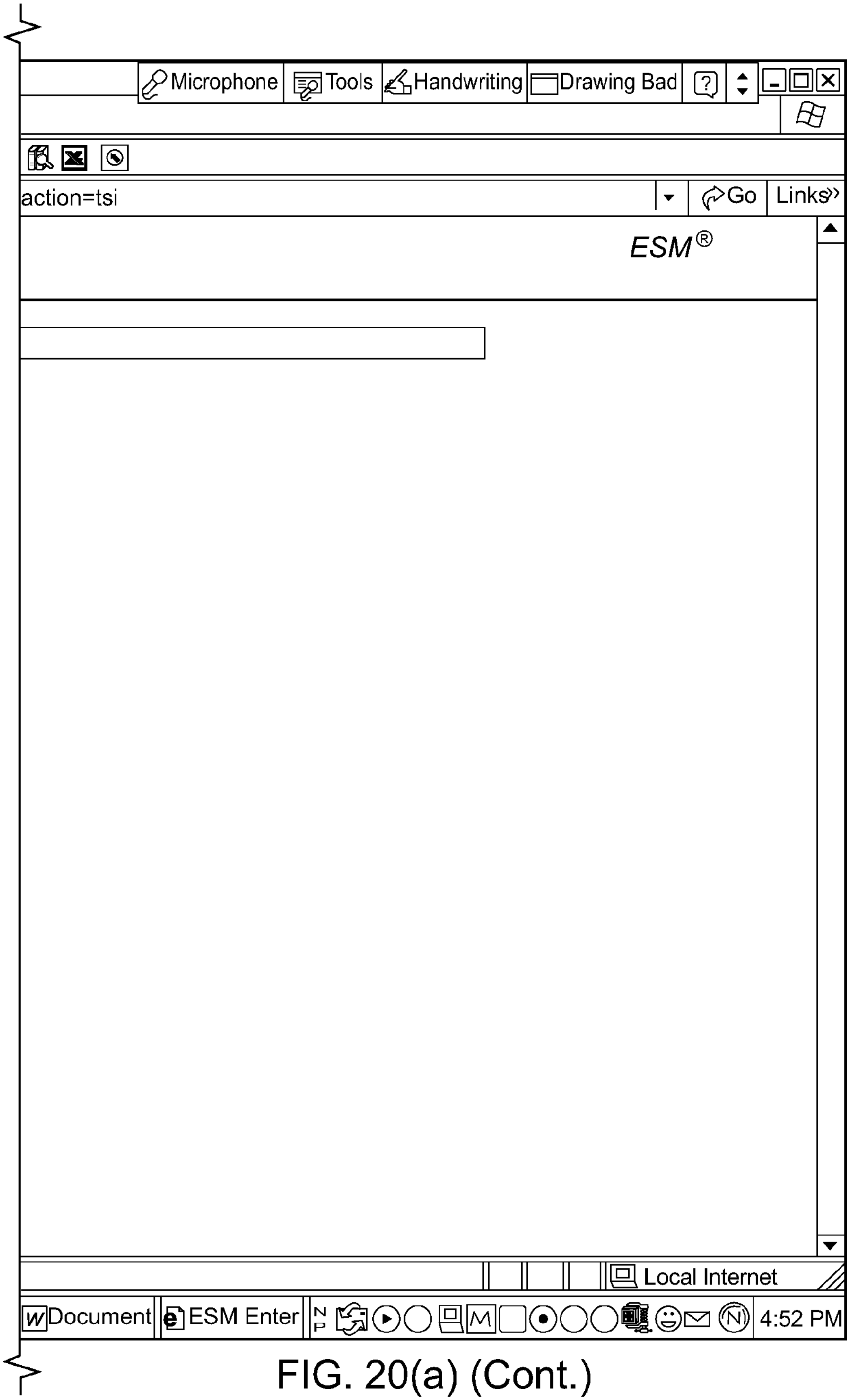

FIG. 20 shows a main menu of the ESM in accordance with an embodiment of the present invention.

Figure 21:
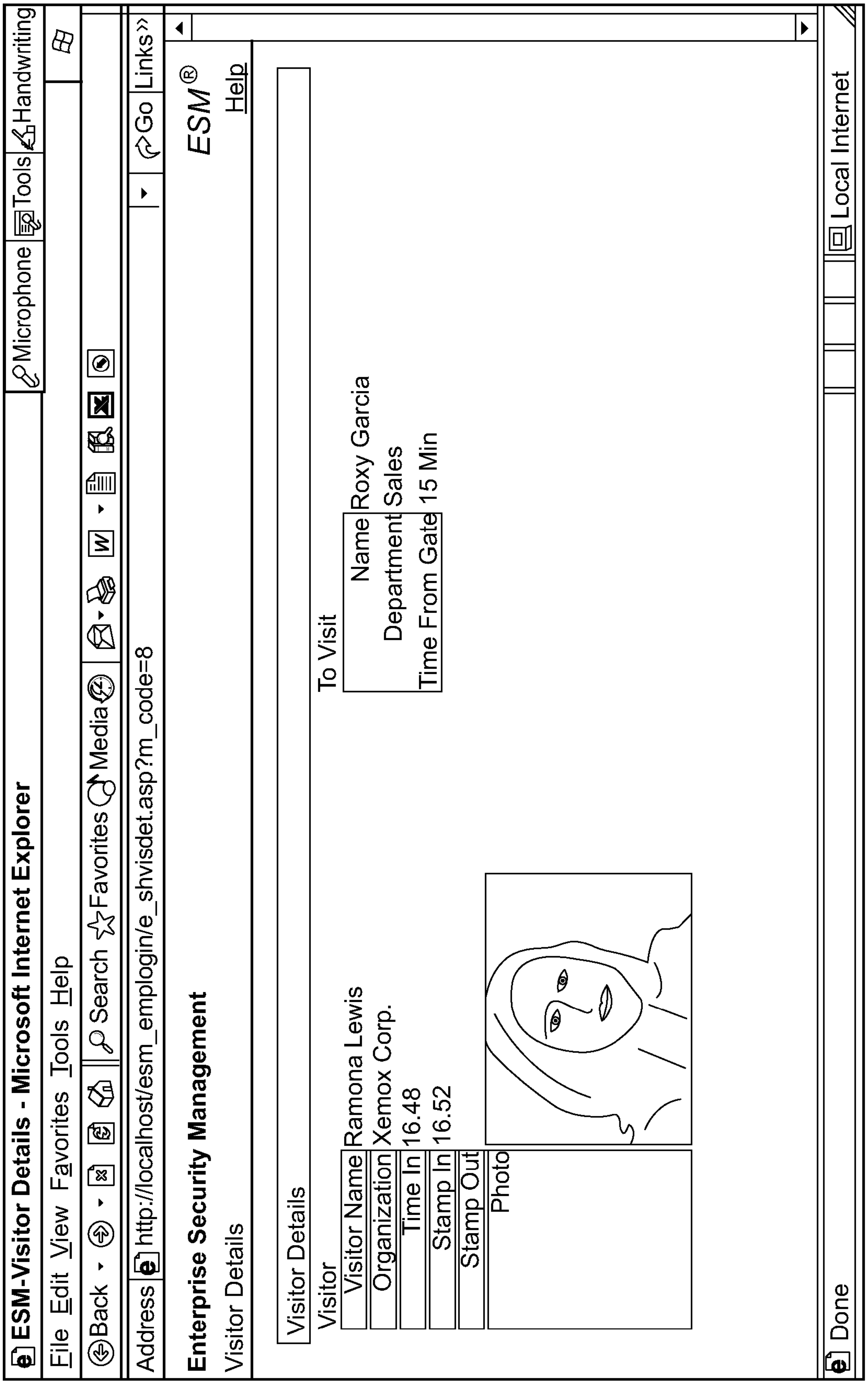

FIG. 21 shows yet another time stamping screen with the visitor Roxy Garcia's picture appearing and the duration of her stay being indicated as 15 minutes.

Figure 22:
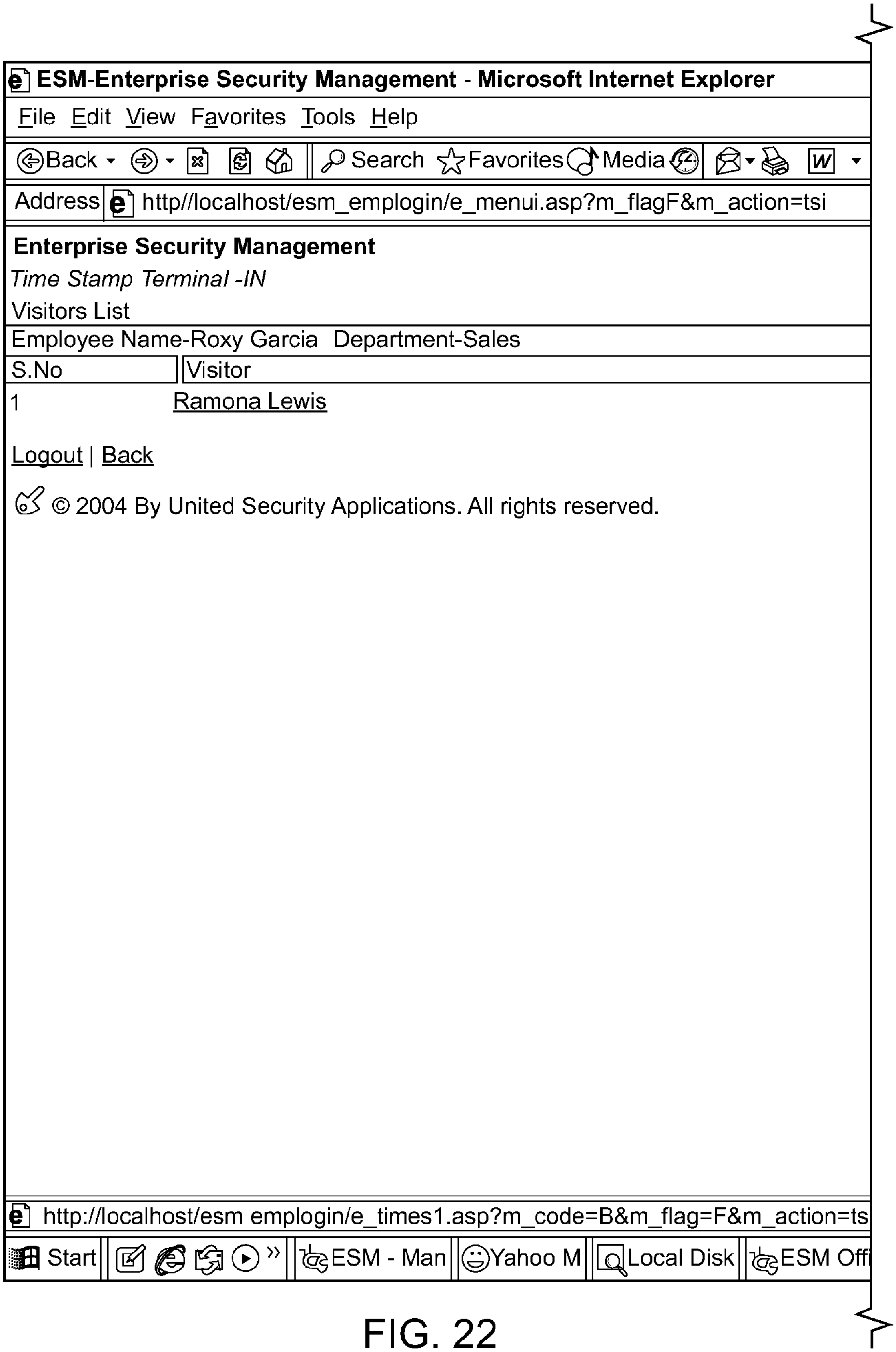
Figure 22:
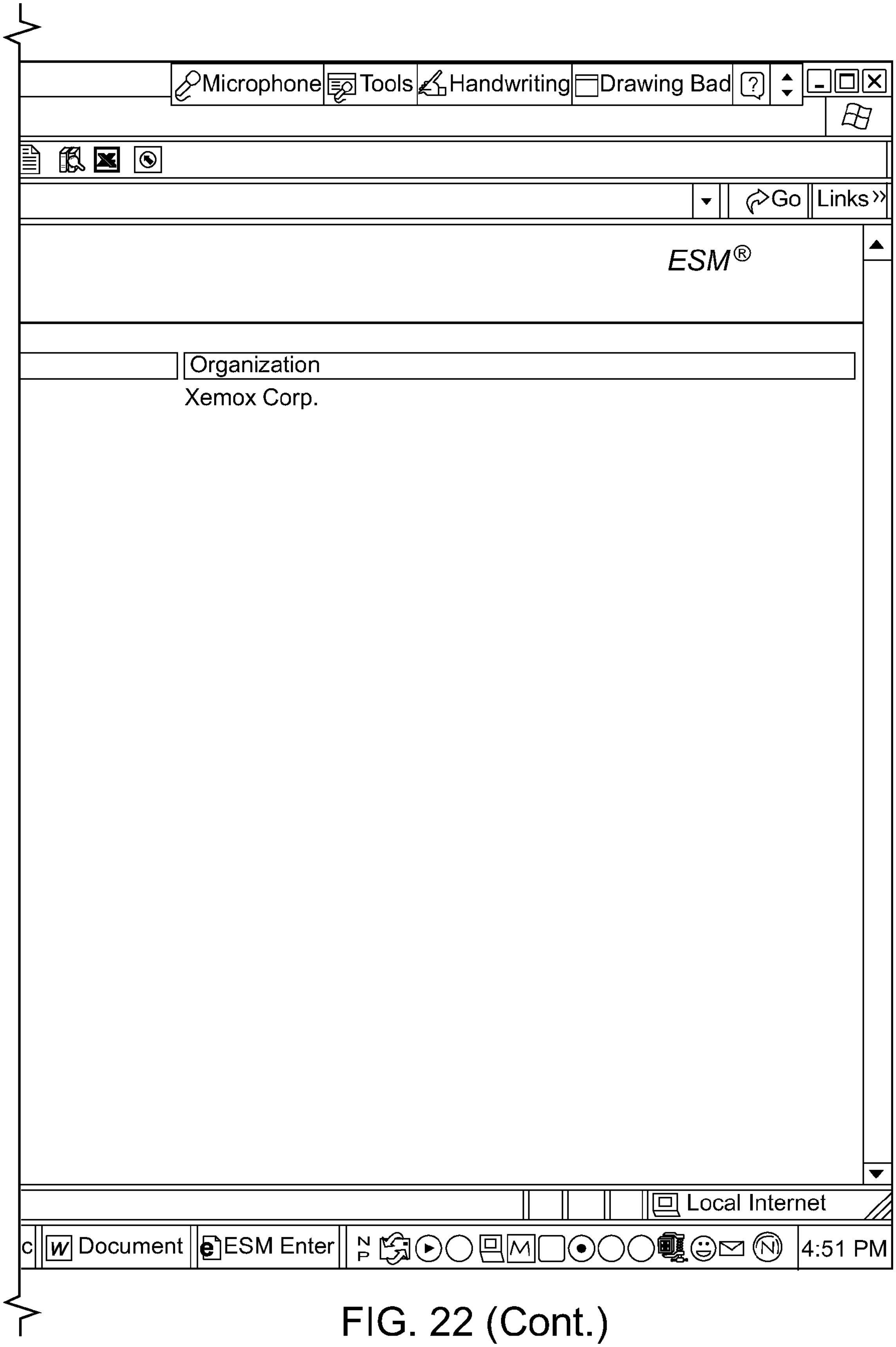

FIG. 22 shows a logout or a time of departure of Roxy Garcia.

Figure 23:
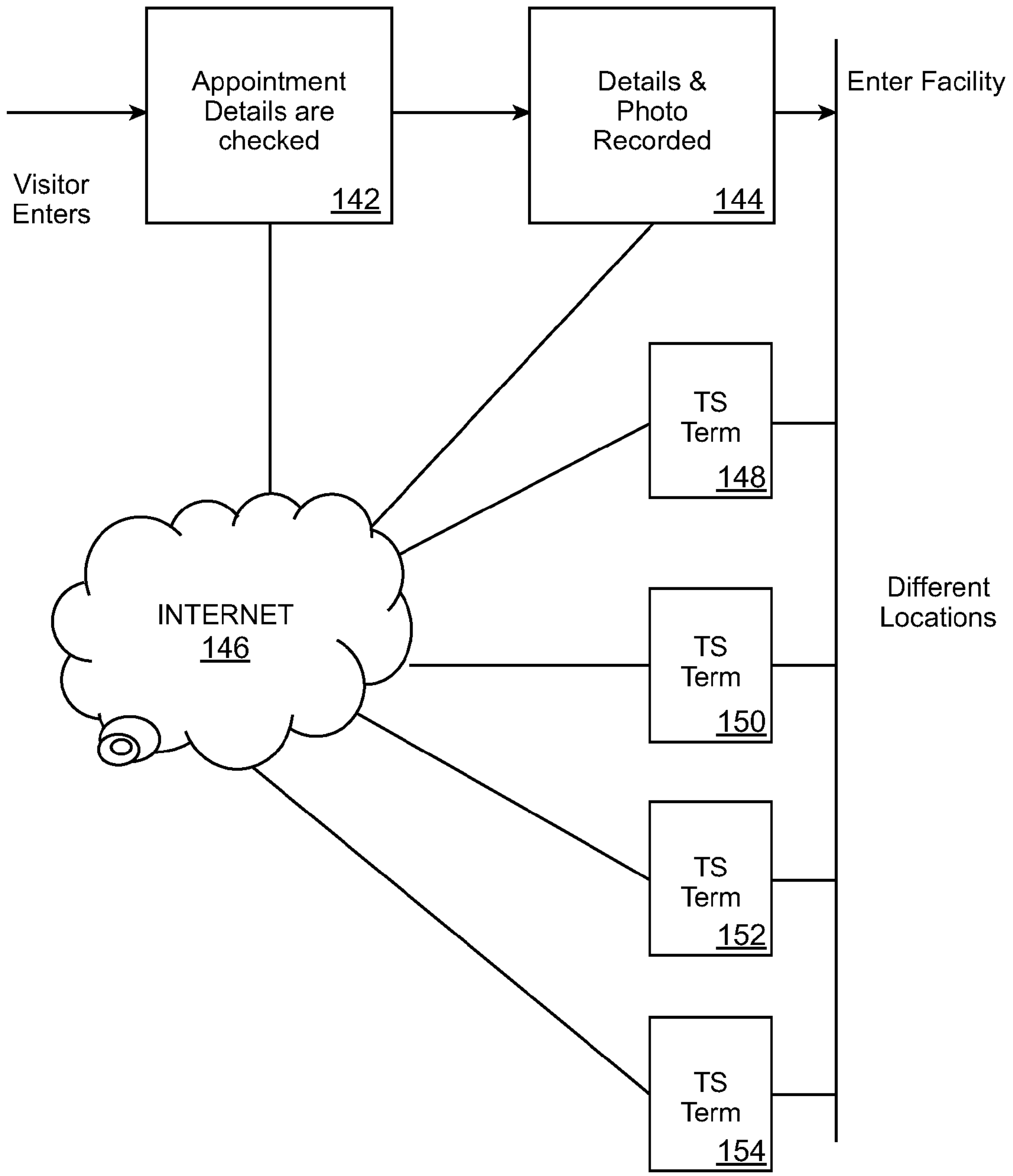

FIG. 23 shows a high-level block diagram of the time stamping process in accordance with yet another embodiment of the present invention.

Figure 24:
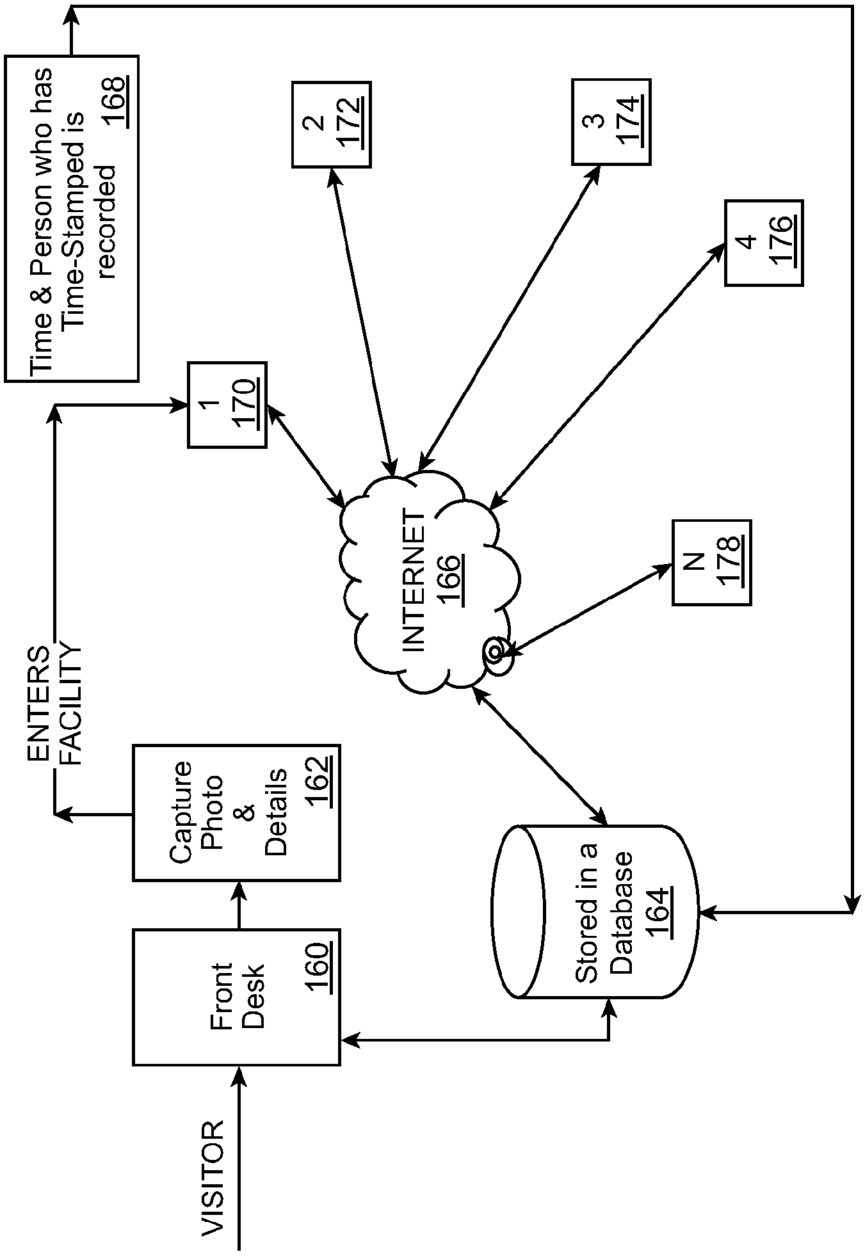

FIG. 24 shows yet another block diagram of the time-stamping process in accordance with an embodiment of the present invention.

Figure 25:
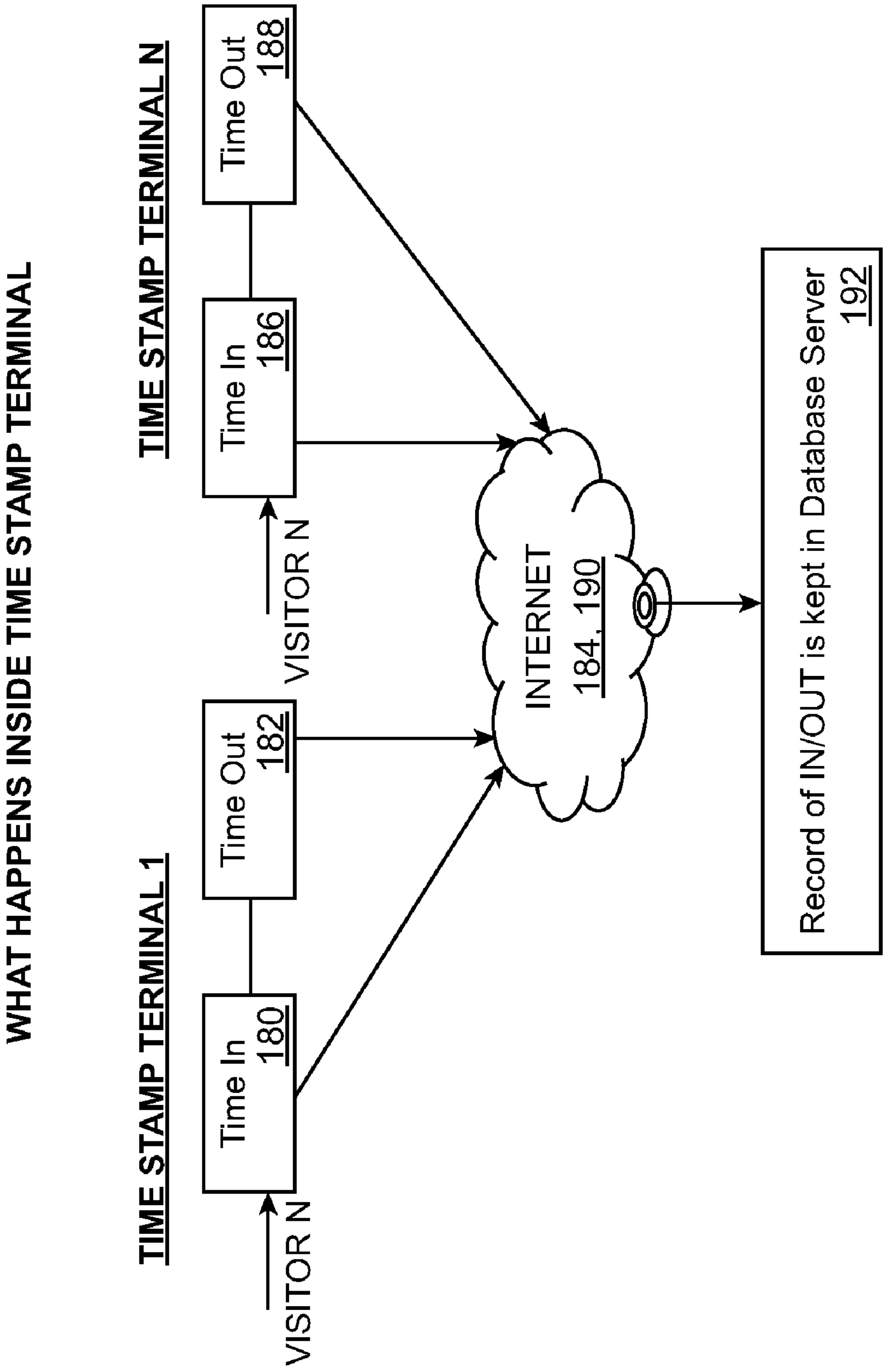

FIG. 25 shows further details associated with the time-stamping process.

DETAILED DESCRIPTION OF THE PREFERRED EMBODIMENTS

Figure 1:
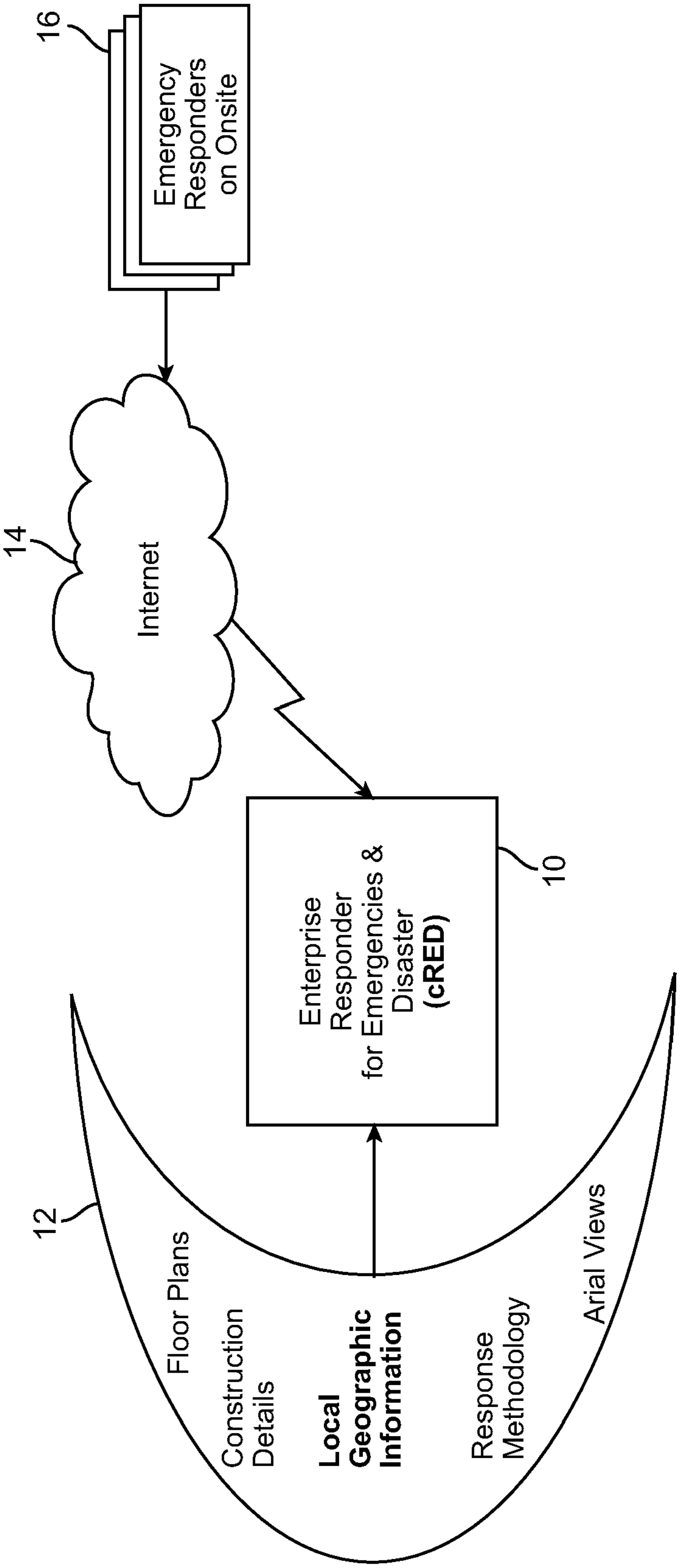
FIG. 1 shows an embodiment of the present invention to include an enterprise responder for emergencies and disasters (eRED) system 10.

Referring now to FIG. 1, an embodiment of the present invention is shown to include an enterprise responder for emergencies and disasters (eRED) system 10 for receiving local geographic information 12 and being accessed, through the Internet 14, by emergency responder(s) on alert 16. The eRED system 10, at its most basic level, functions as repository form information and collaborative platform to access information about identified facilities and wherein such information can be accessed over the Internet, particularly in times of an emergency, disaster or the like. The emergency responder(s) on alert 16 is menu-driven as will be discussed herein below.

Figure 2:
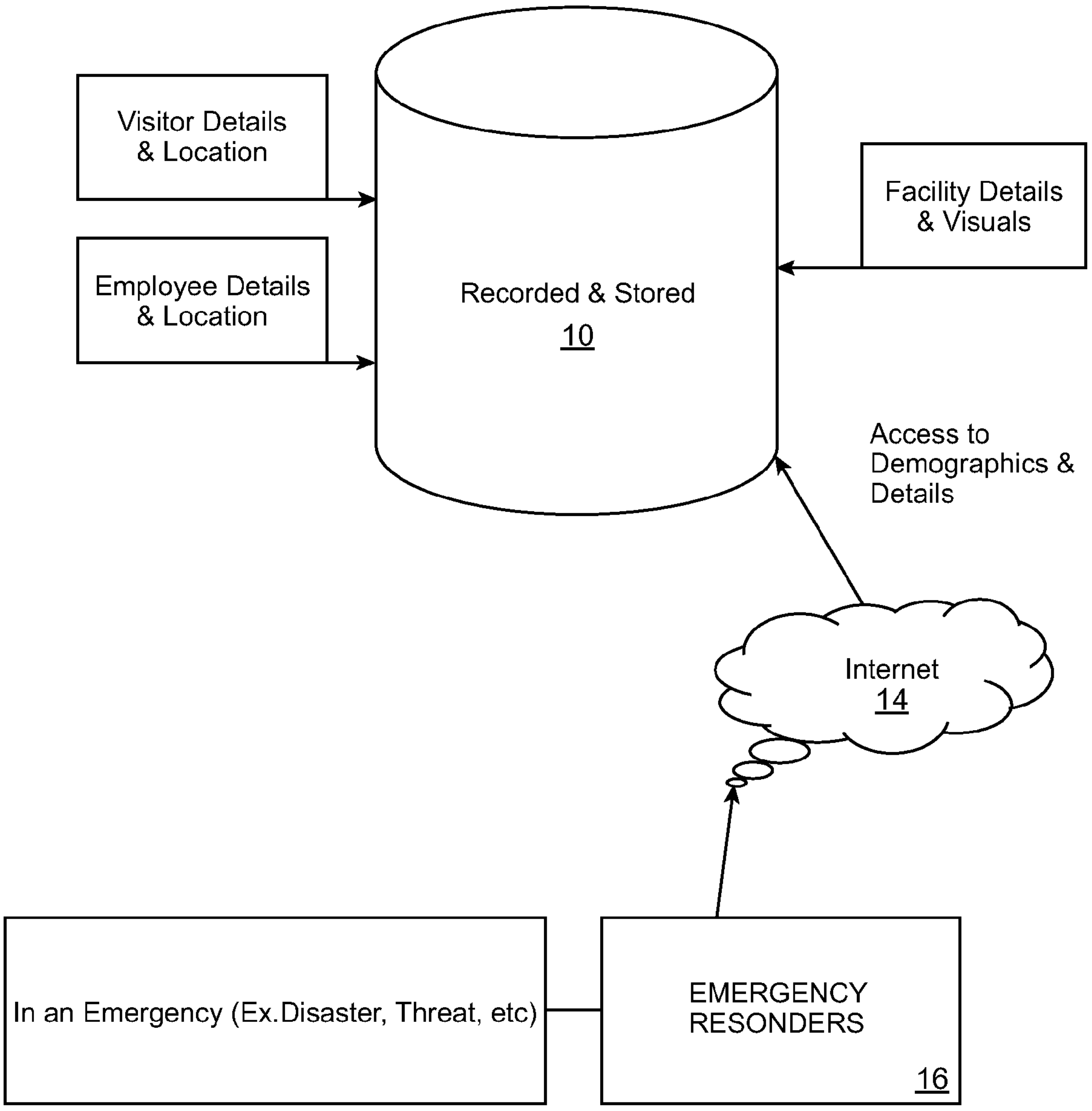
FIG. 2 shows the eRED system 10 of FIG. 1 functioning as a repository, as mentioned above.

FIG. 2 shows the eRED system 10 of FIG. 1 functioning as a repository, as mentioned above. The eRED system 10 records and stores visitor details and location and employee details and location information in addition to facility details and visuals, such as maps, pictures and the like, for access, through the Internet 14, by emergency responders 16, in potentially emergency or disaster types of situations.

Figure 3:
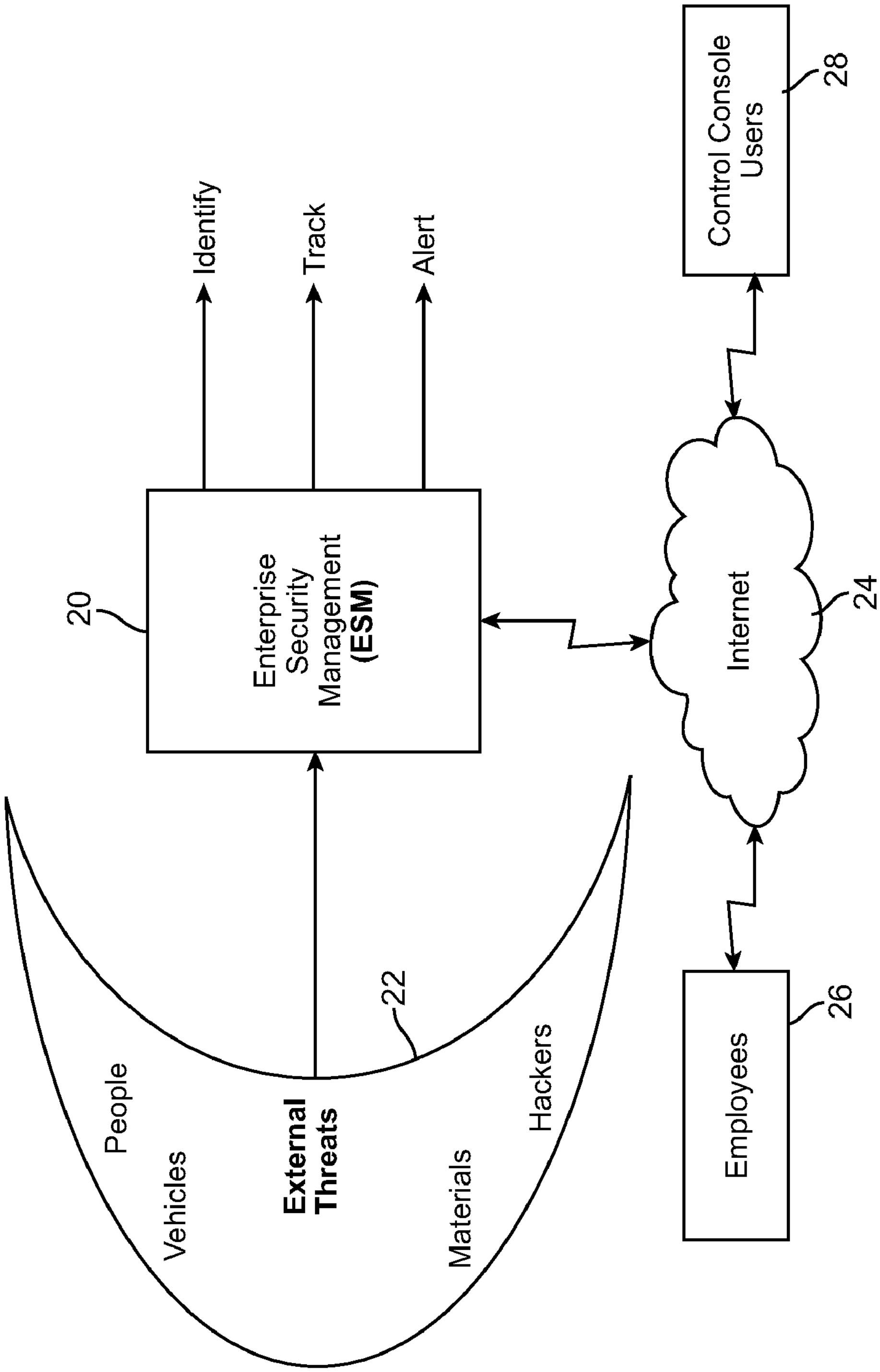
FIG. 3 shows another embodiment of the present invention including the enterprise security management (ESM) system 20.

FIG. 3 shows another embodiment of the present invention wherein the enterprise security management (ESM) system 20 is shown responsive to external threats 22 by entities such as people, vehicles, dangerous materials or hackers, and is operative to identify, track such threats and to alert others regarding the same. The ESM system 20 is accessed, through the Internet 24 by employees 26 and/or control console users 28.

The ESM system 20 of FIG. 3 provides a class solution for identifying, analyzing and controlling the flow of external elements entering or leaving a facility. The need for this type of application arises from the need by most organizations for identifying outsider, i.e. visitors, contractors, maintenance crew, etc., vehicles and material that enter or leave their facility, as all these elements can be a significant sources of threat in today's security environment. Furthermore, the ESM system 20 correlates the identified entry with some insider to the building, such as an employee, who may be involved in sort of conspiracy. The ESM system 20 is a web-based solution enabling organizations to set up security policies all over the enterprise. It also provides powerful analytics and built-in algorithms for detecting suspicious patterns and alerting the organization of a potential threat before it happens.

Figure 4:
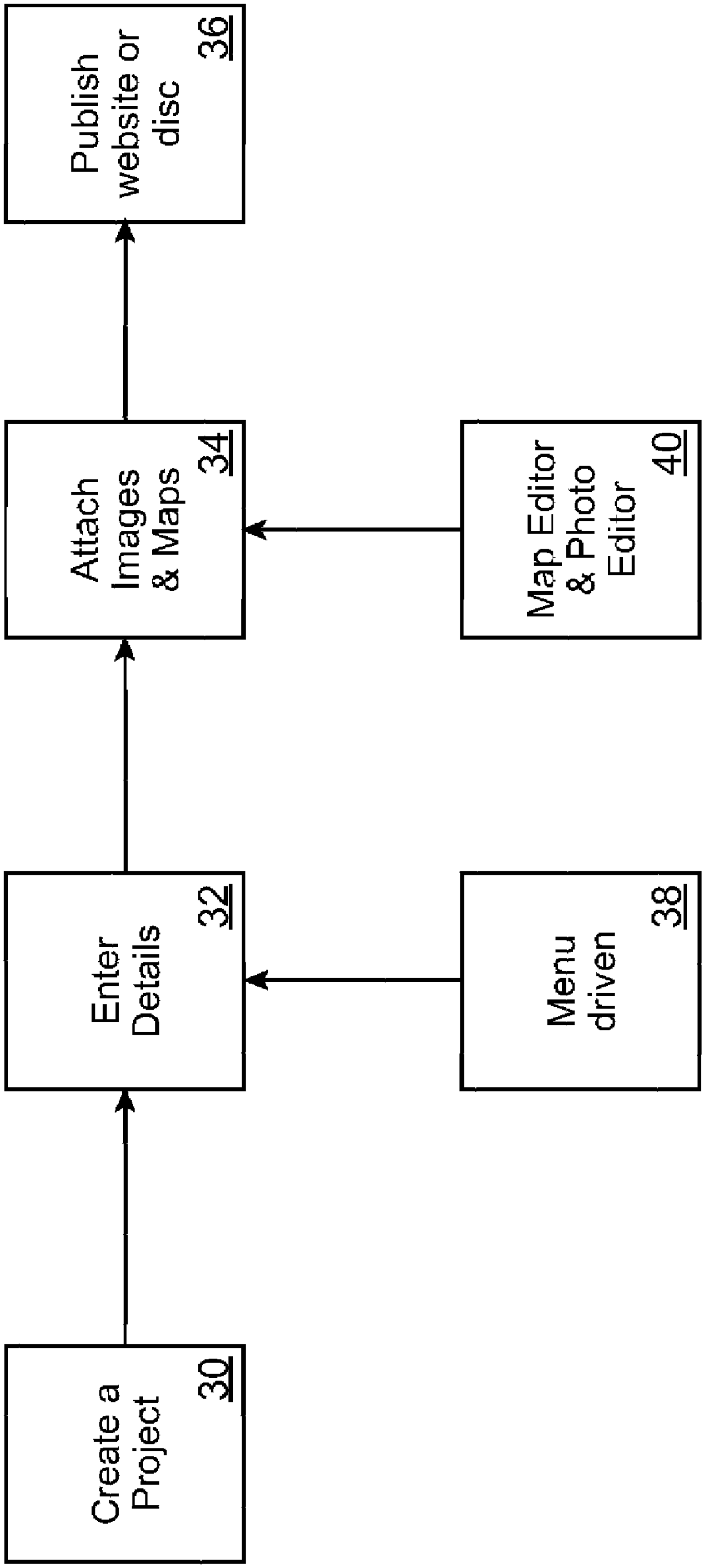
FIG. 4 shows a block diagram of the process of creating a project to be used by either the eRED system 10 of FIG. 1 or the ESM system 20 of FIG. 2.

FIG. 4 shows a block diagram of the process of creating a project to be used by either the eRED system 10 of FIG. 1 or the ESM system 20 of FIG. 2. A "project", as used herein, refers to a website or source of information regarding disaster management and emergency response. In FIG. 4, a project is created, such as a website, using commercially-available website development tools and at 32, details of a particular facility are entered into the website, which is menu-driven, as indicated at 38. Next, at 34, images and/maps, still and movie pictures and virtual tours of the facility with emergency-related details, as shown at 40, are attached. Finally, at 36, the entered and attached information is published when a user uploads such information on a website and/or burns a compact disc or stores such information on a disc. The process of entering details about the facility, such as at 32, is menu-driven, allowing for easy entry thereof. The maps and images of 40 are attached at 34 using map and photo editors provided by the systems 10 and 20.

Figure 5:
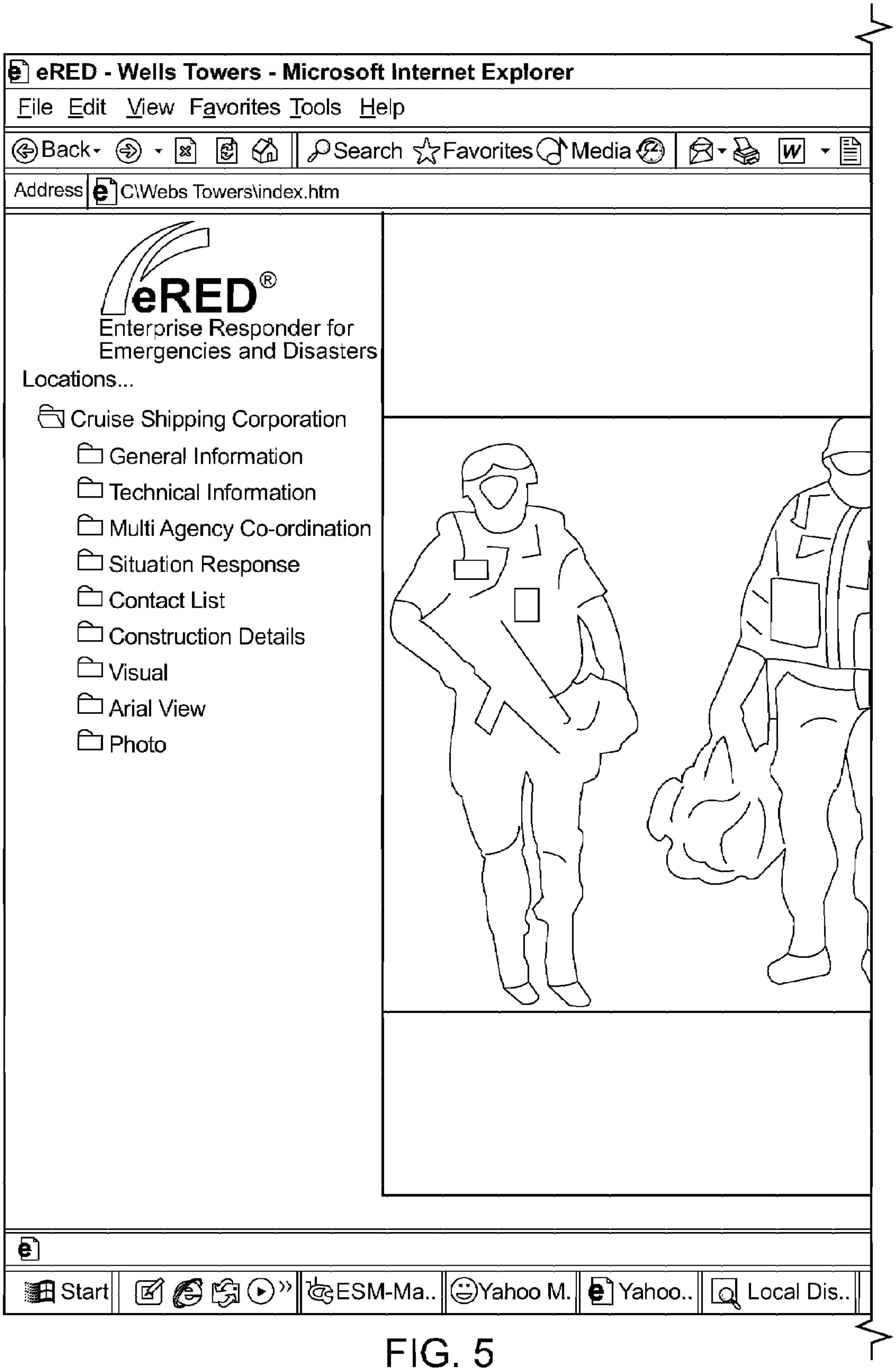
FIGS. 5-10 illustrate an example of the eRED system 10 of FIG. 1, shown through website screens.
Figure 5:
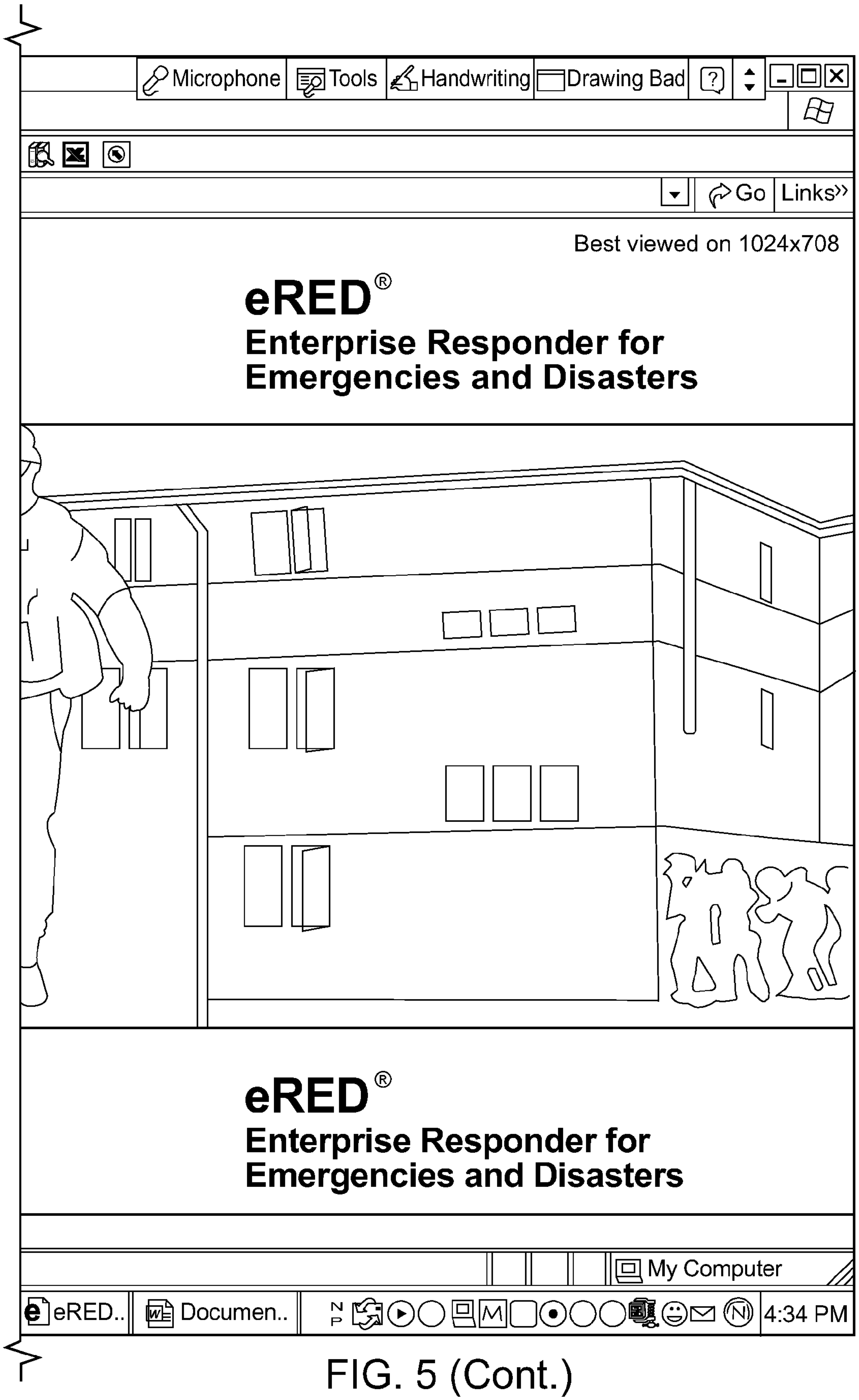
Figure 6:
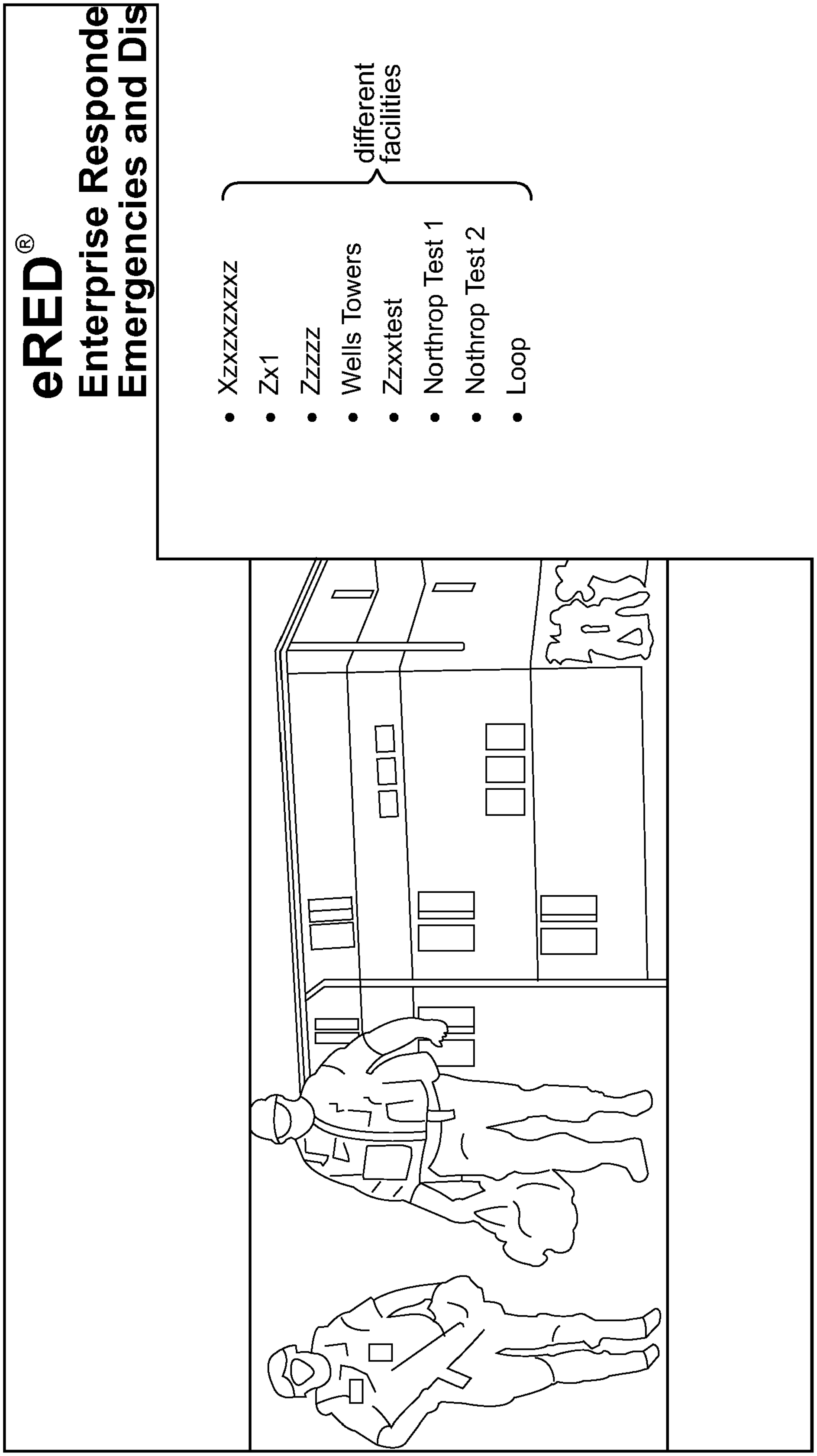
Figure 7:
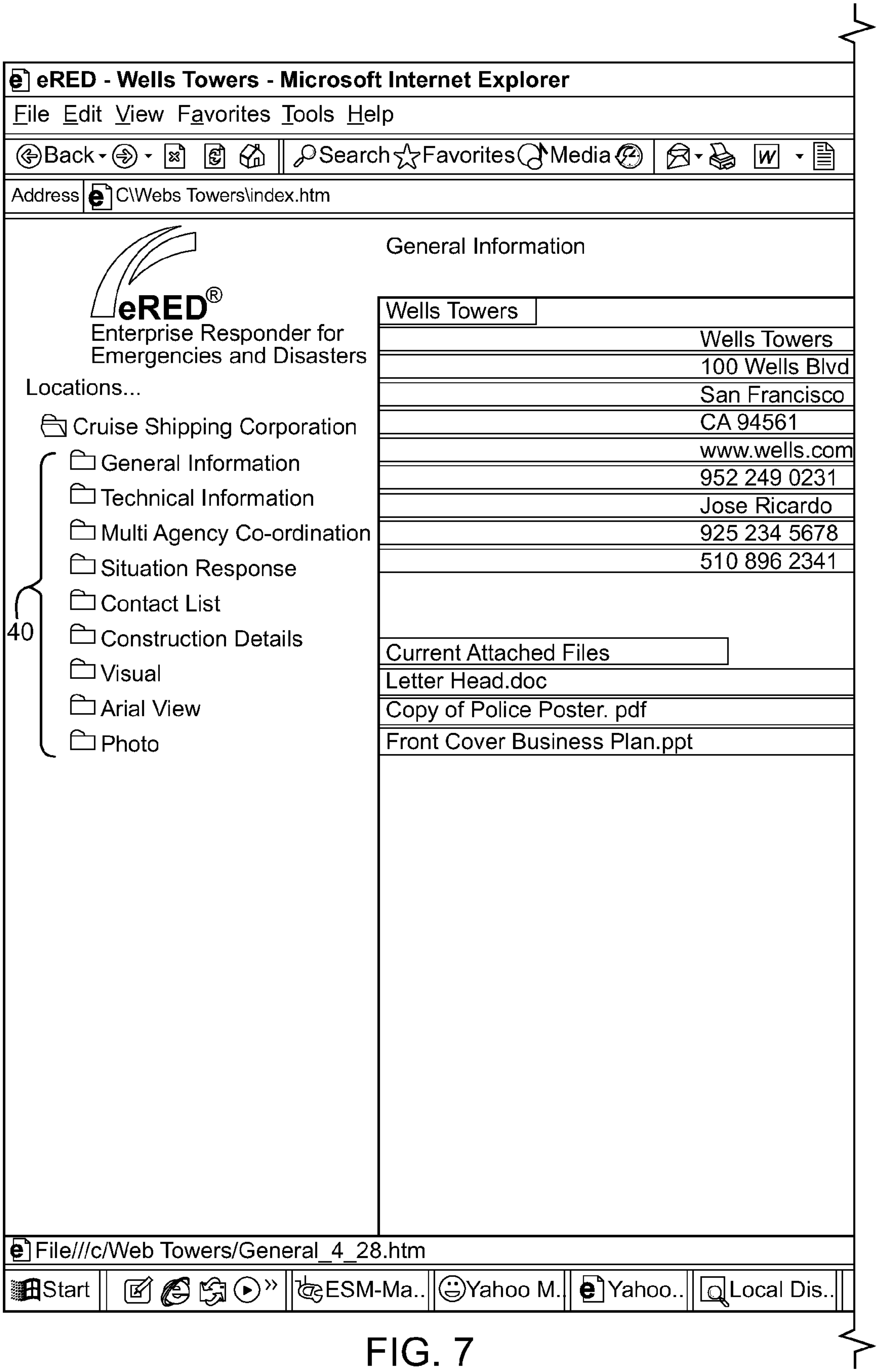
Figure 7:
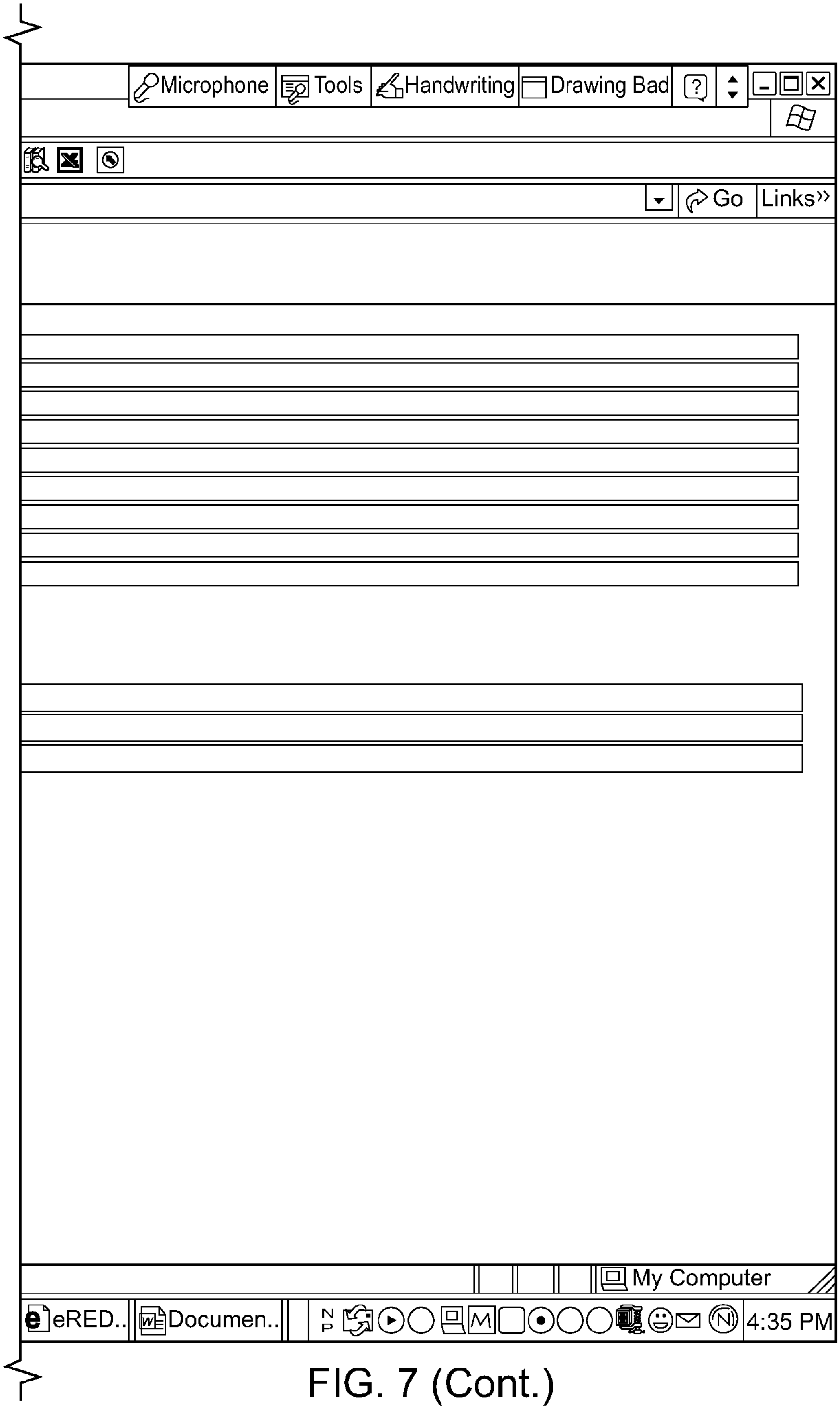
Figure 8:
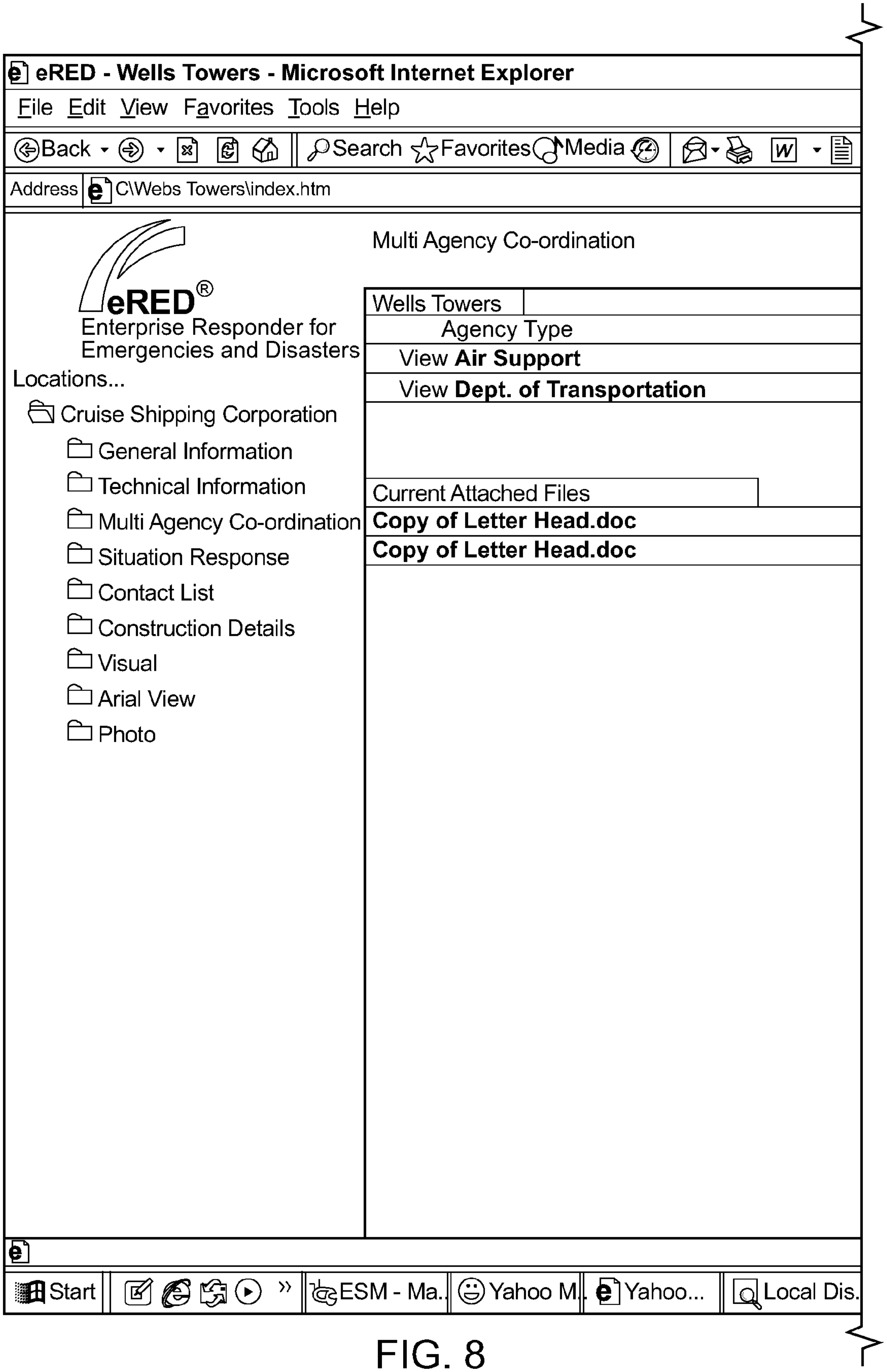
Figure 8:
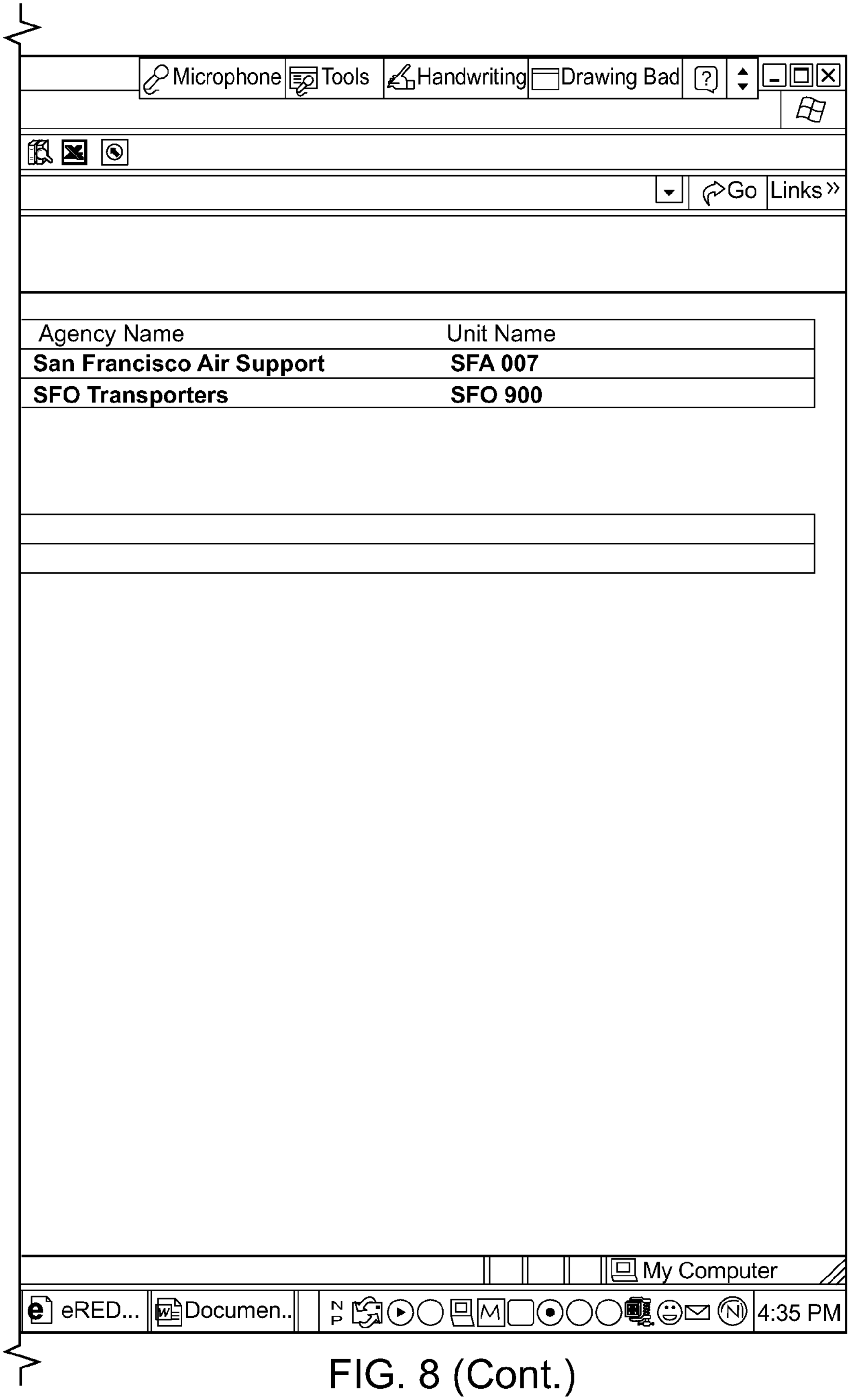
Figure 9:
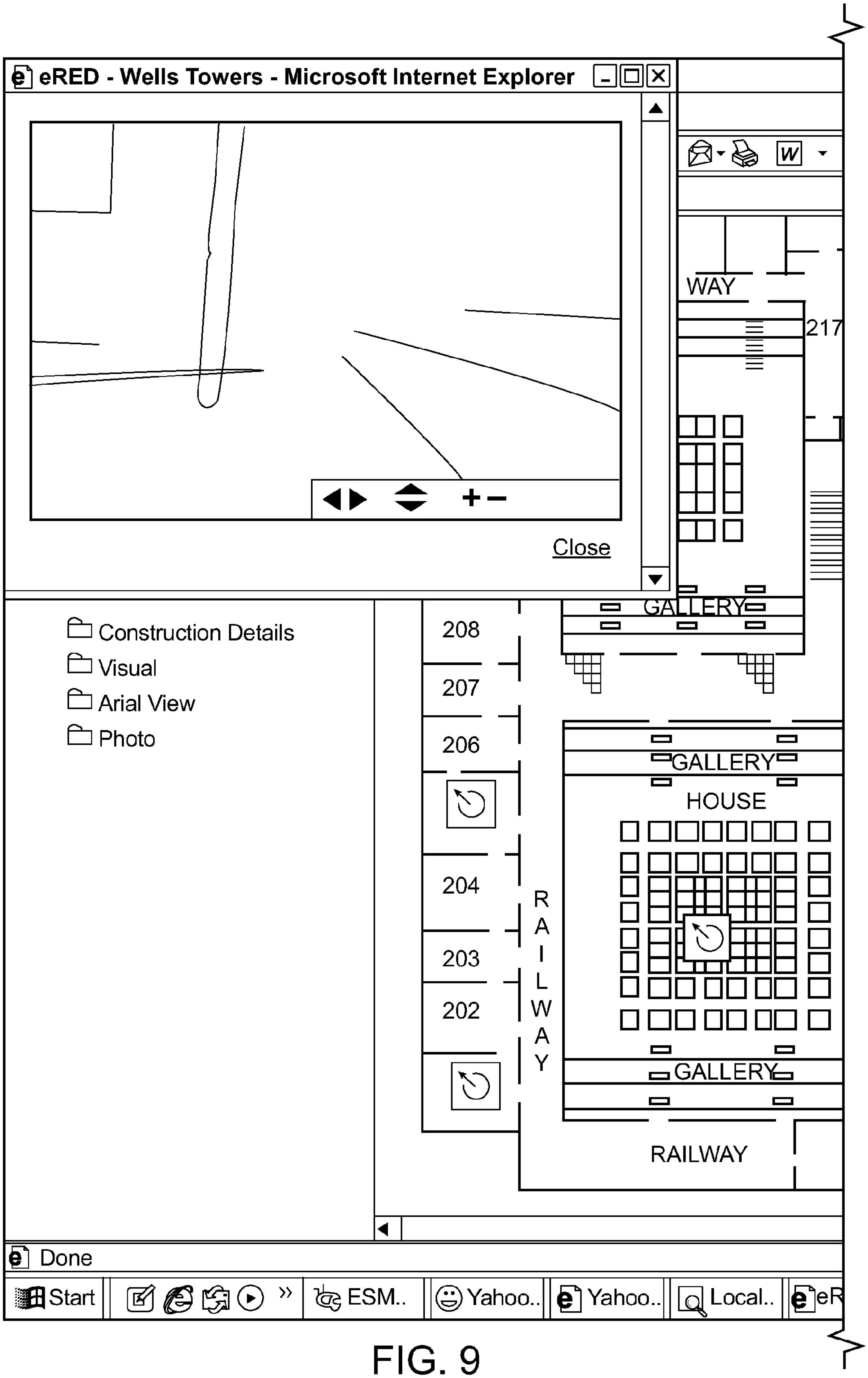
Figure 9:
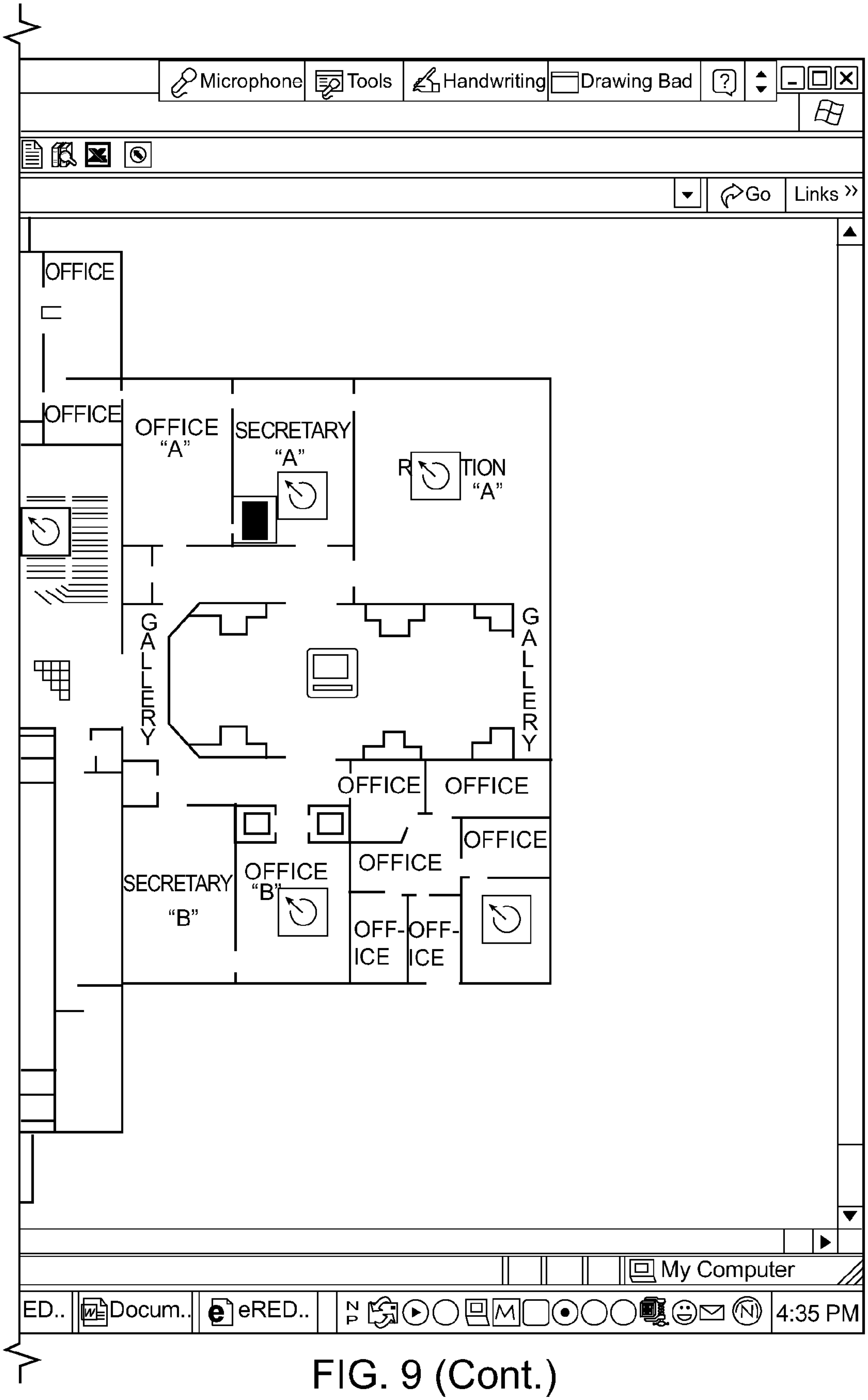
Figure 10:
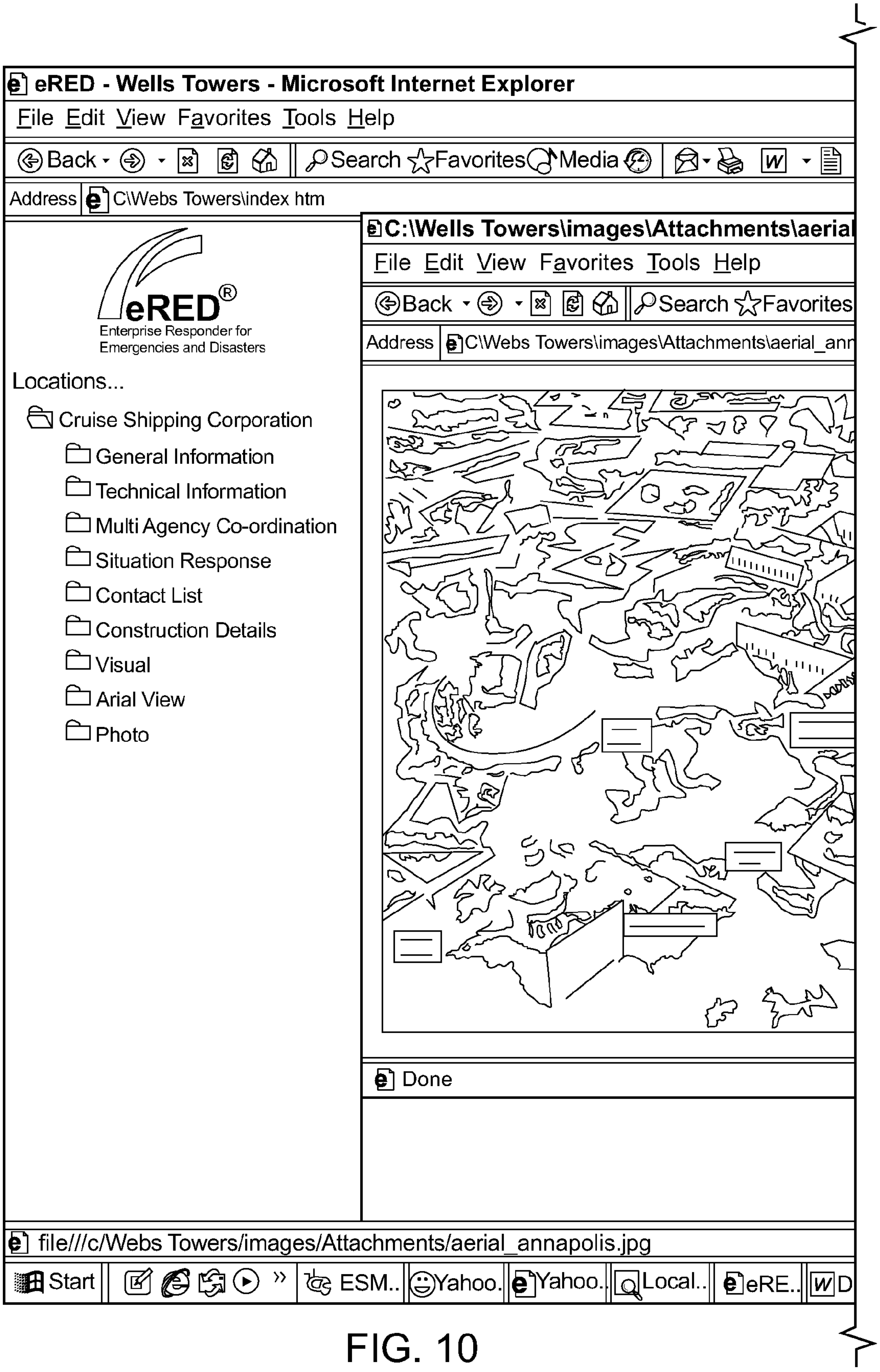
Figure 10:
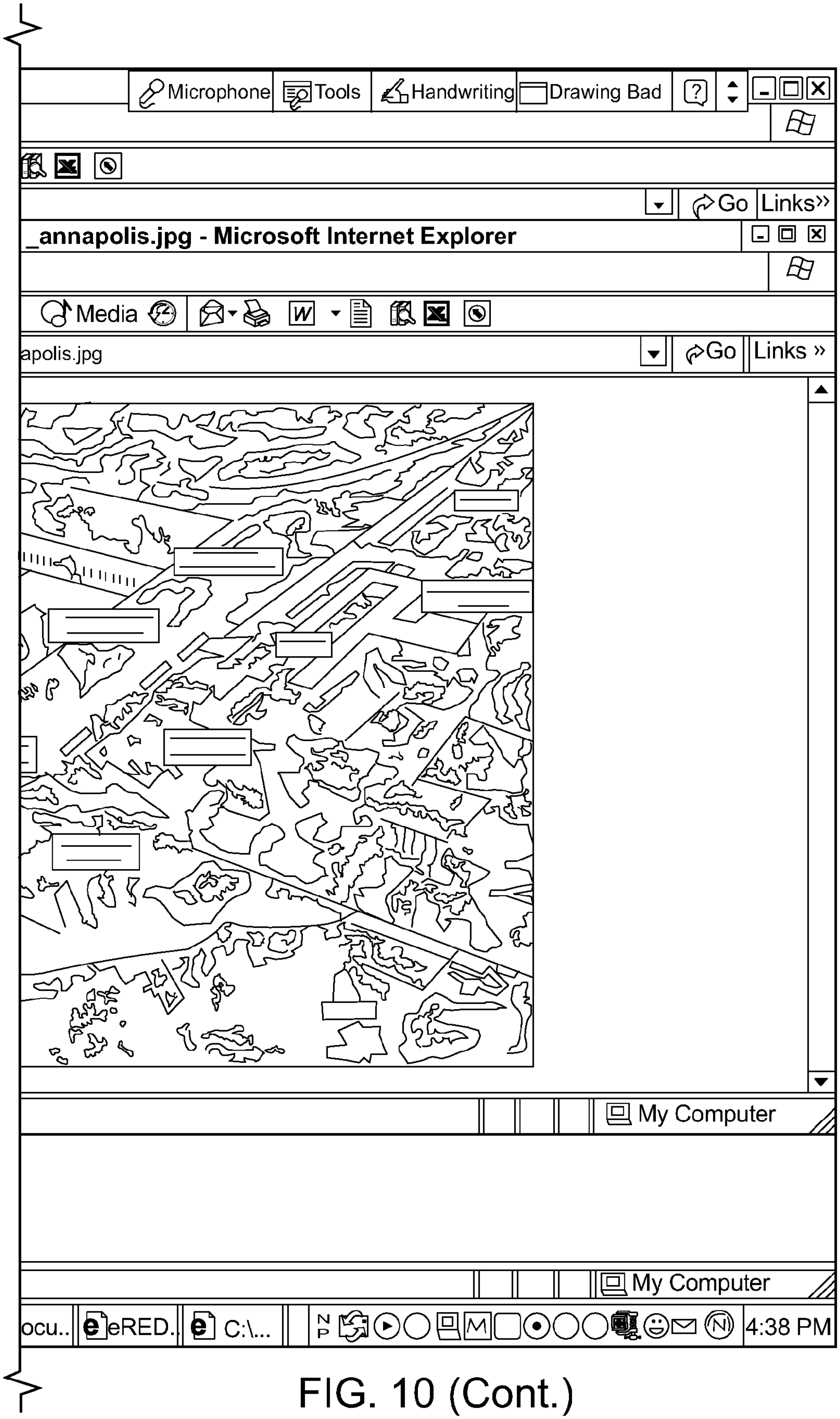

An example of the eRED system 10 of FIG. 1, shown through website screens, is provided in FIGS. 5-10. In FIG. 5, the first screen appears introducing the eRED system 10 program to a user (or respondent). FIG. 6 shows a list of facilities currently known to the eRED system 10 and available to the user. In this example, the "Wells Tower" is chosen as the facility to be explored by the user. FIG. 7 shows a screen including general information about the Wells Tower, such as its address or location and at 40, a number of options are provided to the user regarding information on the Wells Tower. FIG. 8 shows a screen including multi-agency coordination regarding the Wells Tower, such as the closes air support being San Francisco Air Support. FIG. 9 shows a screen including an architectural drawing of the Wells Tower. FIG. 10 shows a screen including an aerial view of the Wells Tower. The information on FIGS. 5-10 is available electronically, through the Internet, and on the eRED system 10 website. Security measures can be placed to ensure that only predetermined individuals or entities can access the website thereby avoiding access thereof by undesirable individuals.

Figure 11:
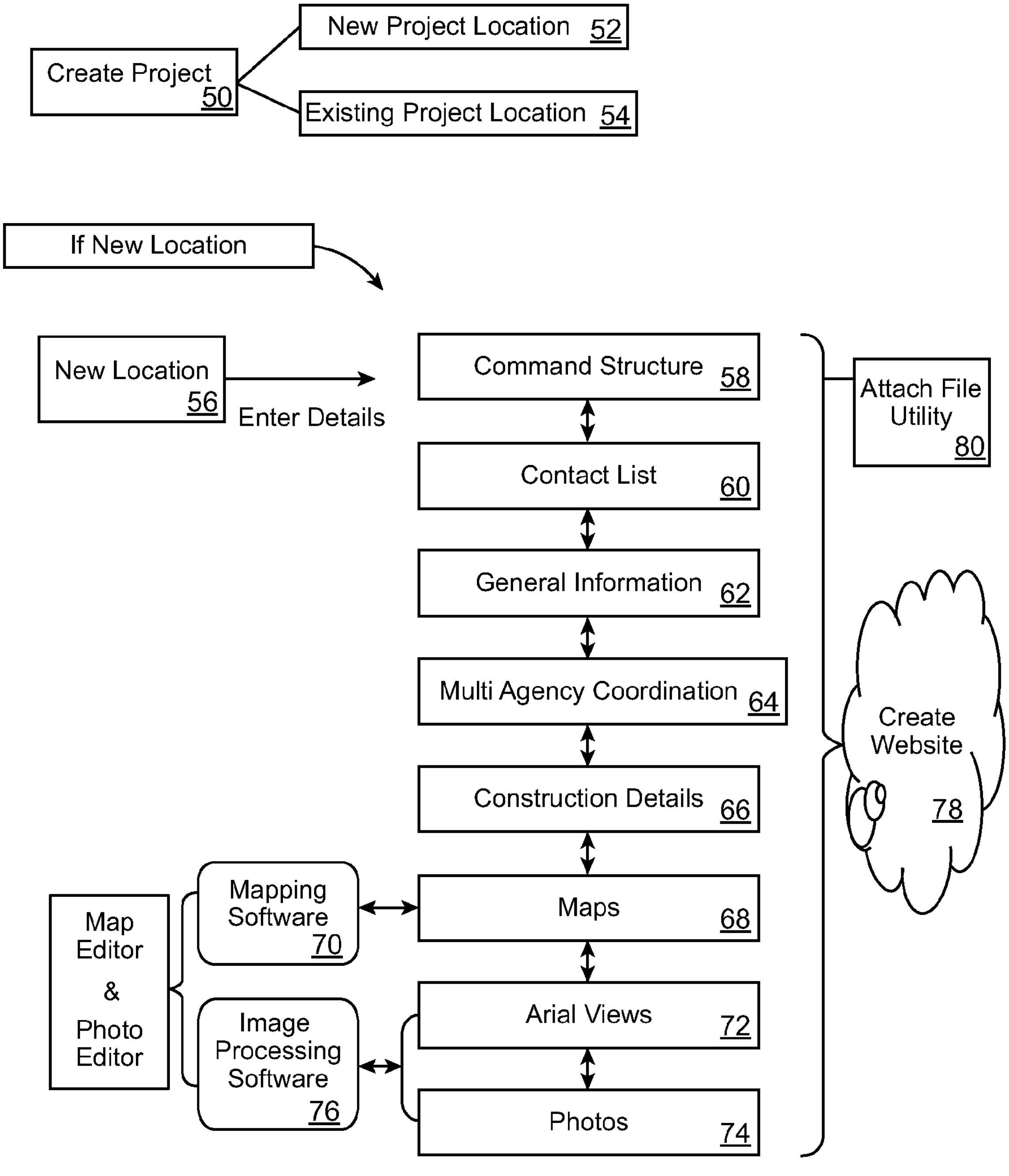
FIG. 11 shows further details of the 'create a project' 30 of FIG. 4, which can be employed by the systems 10 or 20.

Further details are disclosed of the 'create a project' 30 of FIG. 4, which can be employed by the systems 10 or 20, in FIG. 11. At 50, a project or website is created either for a new location 52 or an existing location 54. As to a new location or facility, details are entered at 56. That is, through a predetermined command structure at 58, which is made available to a user of the systems 10 and 20, certain information is entered regarding the new facility. At 60, a contact list is entered, at 62, general information is entered, at 64, multi-agency coordination information is entered, at 66, construction details are entered, at 68, maps are entered. Such maps are created using a software program at 70. At 72, aerial view of the new facility is entered and at 74, photographs of the new facility are entered. The information at 72 and 74 are created using an image processing software program at 76.

Next, at 78, a website is created and a file utility including the information entered at 58-76 is attached at 80.

Figure 12:
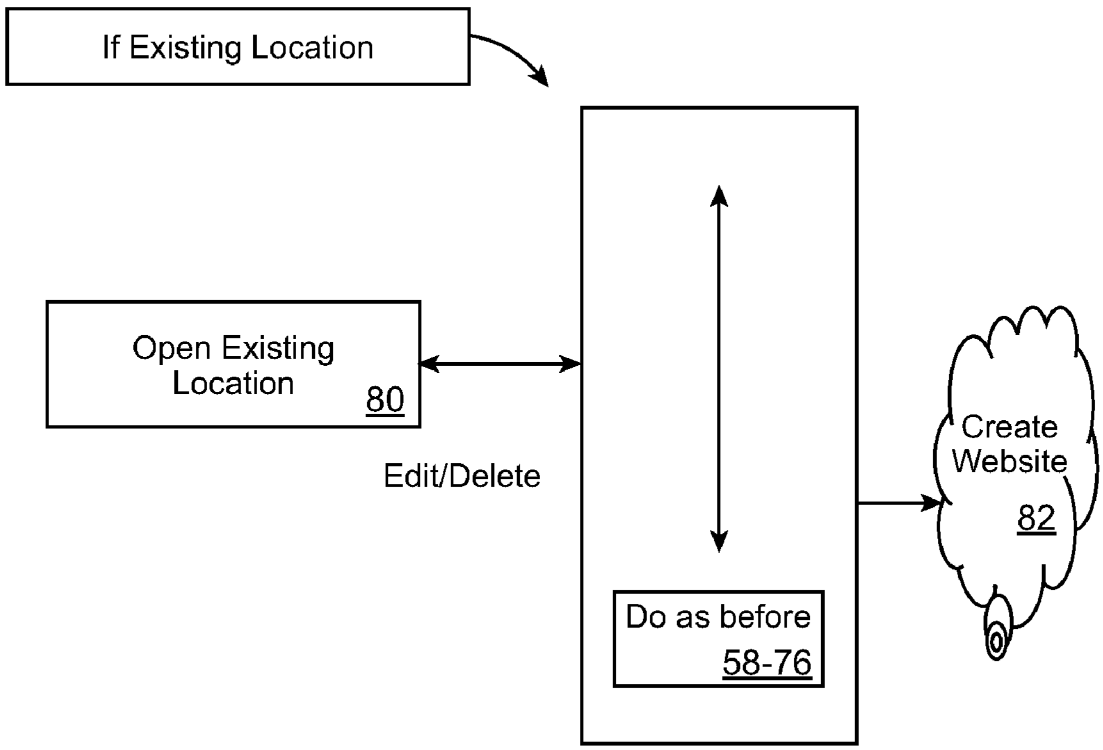
FIG. 12 shows the steps performed when an existing location 54 of FIG. 11 is visited.

FIG. 12 shows the steps performed when an existing location 54 of FIG. 11 is visited. At 80, the existing location is opened as a screen on a website to a user. Next, steps 58-76 of FIG. 11 are performed to edit or delete information regarding an existing facility and at 82, a website is created.

Figure 13:
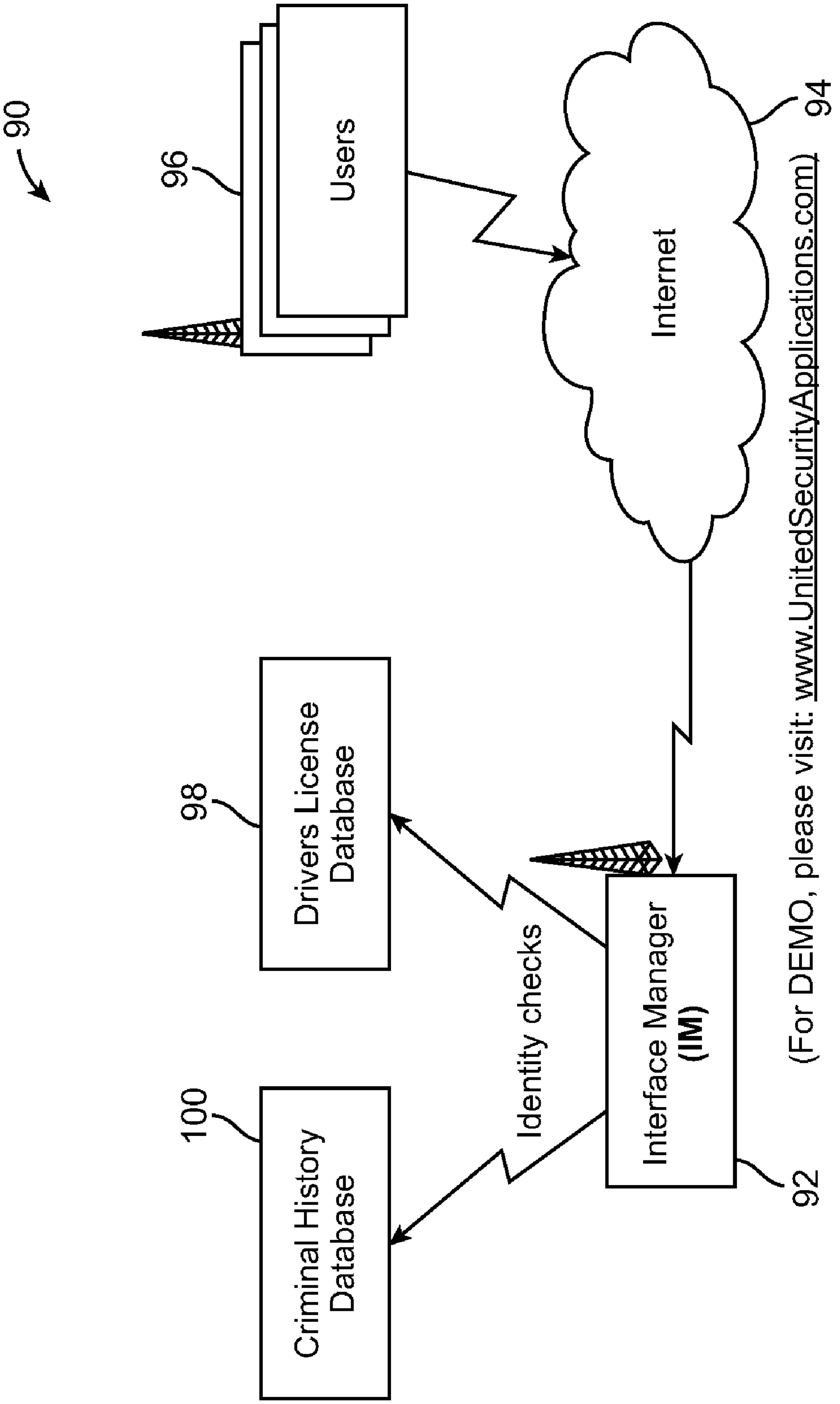
FIG. 13 shows an interface manager system 90 in accordance with another embodiment of the present invention.

FIG. 13 shows an interface manager system 90 in accordance with another embodiment of the present invention. The system 90 is shown to include an interface manager 92, the Internet 94 and users 96. The interface manager 92 allows users 96 to capture data stored in databases 98 and 100, for storing information such as driver's licenses and criminal history, to be available for inputting into client applications. The interface manager 92 can be employed with the systems 10 and 20 of previous figures to perform background checks.

Figure 14:
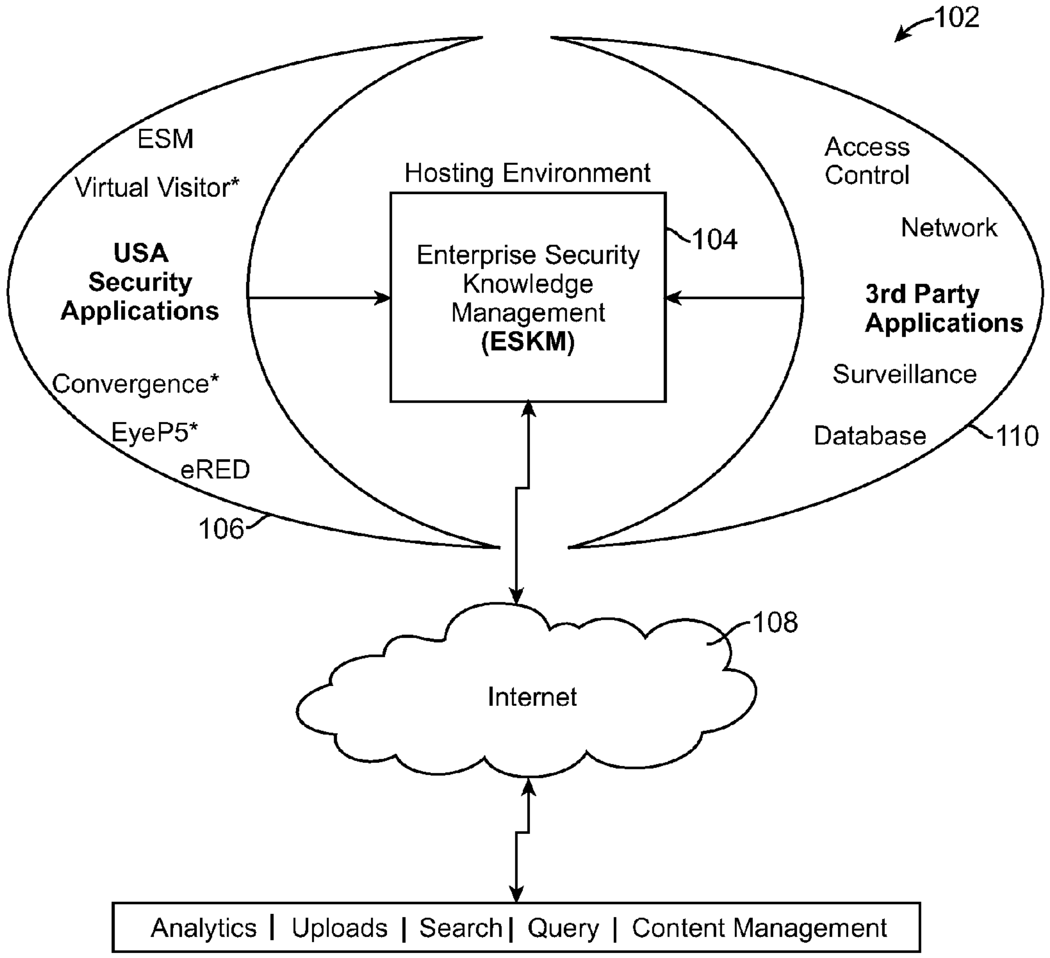
FIG. 14 shows an enterprise security knowledge management (ESKM) system 102 in accordance with yet another embodiment of the present invention.

FIG. 14 shows an enterprise security knowledge management (ESKM) system 102 in accordance with yet another embodiment of the present invention. The system 102 is shown to include a ESKM 104 for receiving information from the applications 106 and the third party applications 110 and for communicating, through the Internet 108, to users. ESKM 104 is a knowledge and content management software program providing hosting for many applications, such as the systems 10 and 20. By creating a platform to link the applications 106 and 110 (applications and databases), it allows the users to execute powerful analytics thereon. Furthermore, it selectively disseminates information, based on roles, to different people in an enterprise.

Figure 15:
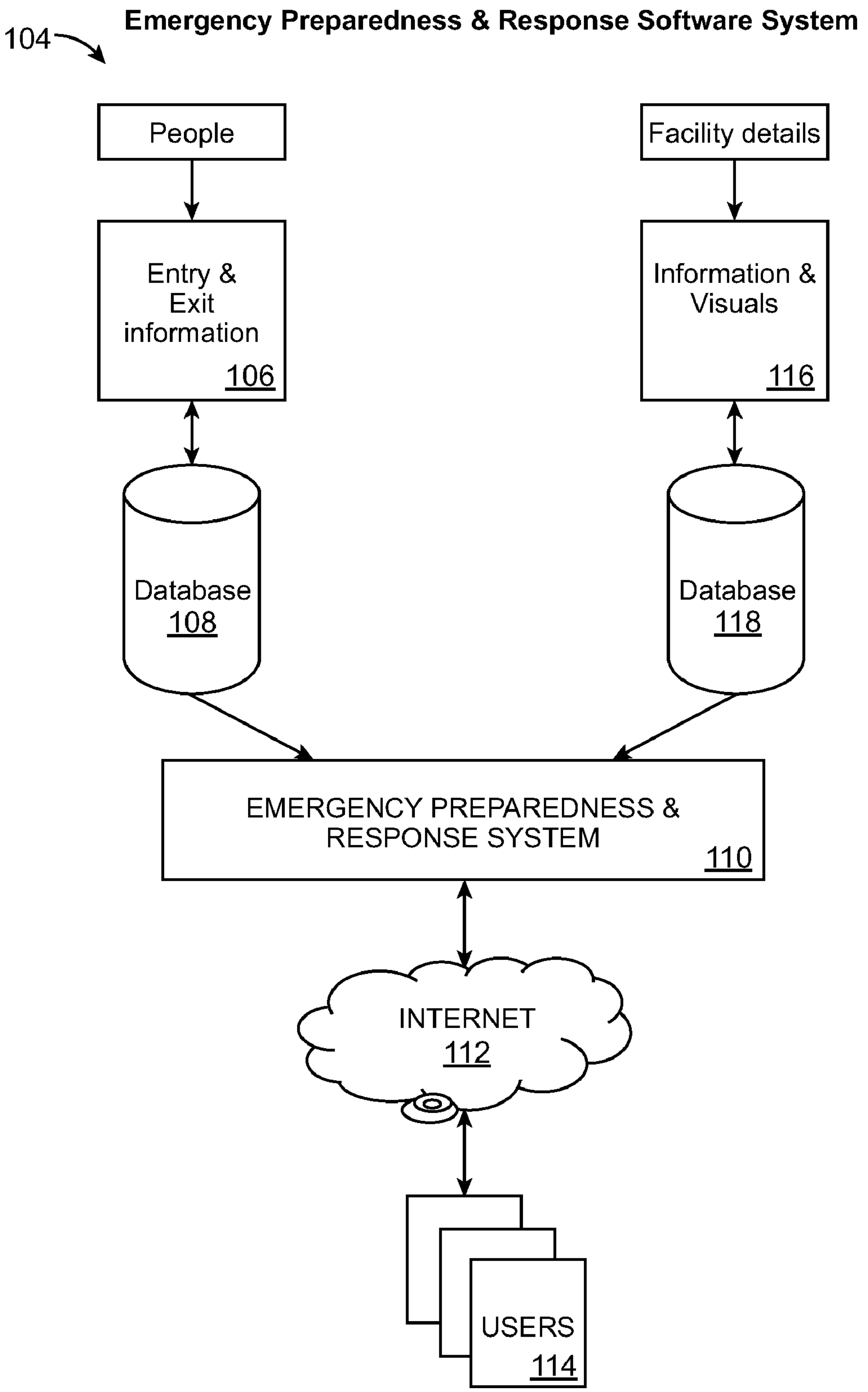
FIG. 15 shows a high-level block diagram of an emergency preparedness and response software system 104.

FIG. 15 shows a high-level block diagram of an emergency preparedness and response software system 104. The system 104 is shown to include entry and exit information block 106 for receiving information regarding people that are authorized to use a particular facility. The information 106 is then stored within a database 108 for use by the emergency preparedness and response system 110. The information and visuals 116 is responsive to facility details, such as structural information, aerial view and the like. The information and visuals 116 is stored within the database 118 for use by the emergency preparedness and response system 110. The emergency preparedness and response system 110 sends information, over the Internet 112, to the users 114.

FIG. 16 shows a host email application 120 for sending email for visitor appointments 130 to the system email editor 122. At 124, a determination is made as to whether or not a valid email identification is registered and if not, the process returns to the host email application 120, otherwise, a screen on a website, is populated with visitor data or information. A visitor is a person visiting a facility that is intended on being a secure facility by employing one or more embodiments of the present invention. Next, the front office of the facility, at 128, stores the visitor information of 126, and notes or stamps it on the day of the visit.

FIGS. 17-22 show an example of the screens that a user sees during operation of the ESM 20 of FIG. 3. The screens of FIGS. 17-22 are created using a web-used application. In FIG. 17, a screen is shown for creating a badge for a visitor visiting a secure facility. Various fields are indicated, such as the "Organization" to which the visitor belongs, the visitor's name, department, the person within the facility the visitor is to meet, the visitor's address, the purpose of the visit and so on. FIG. 18 shows an ESM screen with various options shown at 140 for the user to select.

FIG. 19 shows a screen of the existing visitor list of a secure facility. Clearly, this list can be and generally is modified by the user as the list of visitor changes. FIG. 20 shows a main menu of the ESM in accordance with an embodiment of the present invention. FIG. 20 (*a*) shows a particular visitor, namely Ramona Lewis, in the Sales department, having come into the building at 16:48 military time. One of the features of the ESM 20 is time-stamping or noting the time of arrival of a particular visitor, the duration of stay of the visitor and the time of departure of the visitor. In this manner, if a visitor is allotted a certain duration of time to stay in the facility and for some reason the visitor overstays their visit, the ESM 20 becomes aware of the same and if programmed so, can set off an alarm or in some manner, alert the facility operators of this event. Time stamping is further discussed below with respect to additional figures.

FIG. 21 shows yet another time stamping screen with the visitor Roxy Garcia's picture appearing and the duration of her stay being indicated as 15 minutes. FIG. 22 shows a logout or a time of departure of Roxy Garcia.

FIG. 23 shows a high-level block diagram of the time stamping process in accordance with yet another embodiment of the present invention. At 142, appointment details regarding visitors of a facility are checked. Next, at 144, details, such as photographs are recorded or stored onto a database. The visitor enters the facility and is time-stamped at any one of the time stamp terminals 148-154. 142 and 144 and the terminals 14-154 communicate through the Internet 146. As the visitor visits various parts of the facility, the visitor may be time-stamped at such different locations, such as at terminals 148-154.

FIG. 24 shows yet another block diagram of the time-stamping process in accordance with an embodiment of the present invention. At 160, a visitor enters the facility, at its front desk, lobby or office, then, information regarding the visitor is entered into a database at 164. Additionally, at 162, the visitor's photograph and other detailed information, such as driver's license number and the like, are captured and stored in a database at 164. Next, the captured information is communicated, through the Internet or Intranet 166, to the 'n' number of time stamp terminals 170-178. The visitor is given permission to enter the facility and arrives at time stamp terminal 170 where the visitor's arrival time is time stamped and recorded.

FIG. 25 shows further details associated with the time-stamping process and particularly what occurs inside of a time-stamp terminal. At 180, a visitor is time-stamped in, at a first time stamp terminal, and when the visitor leaves the location of the first time stamp terminal, the visitor is time stamped out at 182. This is performed through the Internet 184 and is recorded and stored in a storage medium, such as a server, at 192. A similar situation is shown for a second time stamp terminal, where a visitor enters a second time stamp terminal area and is time stamped in at 186 and time stamped out at 188 and through the Internet 190, the time stamp in and out is recorded at 192.

Although the present invention has been described in terms of specific embodiments it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. An enterprise security management (ESM) system comprising:

web-based application platform for authorizing and monitoring visitors of a secure facility and for further providing a time-stamping process for noting the time of arrival and departure of the visitors and for alerting authorities when the duration of stay of a visitor has exceeded a predetermined time for visiting and further including an enterprise responder for emergencies and disasters (eRED) system for receiving local geographic information and being accessed, through the Internet, by emergency responder(s) on alert, the received local geographic information for identifying the location of the secure facility thereby allowing fast responsiveness to an emergency.

2. An ESM, as recited in claim 1, wherein said eRED system is operative to function as a repository form information and collaborative platform to access information about identified facilities and wherein the information can be accessed over the Internet, particularly in times of an or disaster.

3. An ESM, as recited in claim 1, wherein said eRED system allows for multiple people to log in and discuss a response strategy in a collaborative manner.

4. An ESM, as recited in claim 1, including an eRED viewer to view information regarding sites on a local machine causing viewing of online and offline utility.

5. An ESM, as recited in claim 1, including a knowledge management utility for keeping other types of data and information which are outside the scope of eRED.

6. An ESM, as recited in claim 1, further including an interface manager utility for performing identity verification to ensure access by authorized people.

7. An ESM, as recited in claim 1, wherein the emergency responder(s) on alert is menu-driven.

8. An ESM, as recited in claim 1, wherein the ESM system is responsive to external threats and is operative to identify and track the threats and to alert regarding the same.

9. An ESM, as recited in claim 1, wherein the ESM system is accessed, through the Internet.

10. An ESM, as recited in claim 1, further including an interface manager for allowing users to capture data stored in databases and for storing information regarding clients.

11. An ESM, as recited in claim 1, further including an enterprise security knowledge management (ESKM) for receiving information from applications and for communicating, through the Internet.

12. An ESM, as recited in claim 1, further including at least one time stamp terminal for time-stamping visitors in the facility.

* * * * *